US012561947B2

(12) United States Patent
Beiser et al.

(10) Patent No.: US 12,561,947 B2
(45) Date of Patent: Feb. 24, 2026

(54) DETECTION OF A CONCEALED PROHIBITED MATERIAL IN AN ITEM, USING IMAGE PROCESSING

(71) Applicant: Seetrue Screening Ltd., Tel Aviv (IL)

(72) Inventors: Koren Beiser, Kfar Saba (IL); Yuval Amsterdam, Kfar Hess (IL); Assaf Frenkel, Ramat Hasharon (IL)

(73) Assignee: Seetrue Screening Ltd., Tel Aviv (IL)

( * ) Notice: Subject to any disclaimer, the term of this patent is extended or adjusted under 35 U.S.C. 154(b) by 415 days.

(21) Appl. No.: 18/106,105

(22) Filed: Feb. 6, 2023

(65) Prior Publication Data

US 2024/0046611 A1　　Feb. 8, 2024

(30) Foreign Application Priority Data

Feb. 7, 2022　(IL) ......................................... 290416

(51) Int. Cl.
| | |
|---|---|
| *G06V 10/74* | (2022.01) |
| *G06T 7/00* | (2017.01) |
| *G06T 7/11* | (2017.01) |
| *G06V 10/44* | (2022.01) |

(52) U.S. Cl.
CPC .......... G06V 10/761 (2022.01); G06T 7/0004 (2013.01); G06T 7/11 (2017.01); G06V 10/457 (2022.01); G06T 2207/20076 (2013.01); G06T 2207/30112 (2013.01)

(58) Field of Classification Search
CPC ............... G06V 10/761; G06V 10/457; G06V 2201/05; G06V 10/25; G06V 10/751;

G06V 20/52; G06V 10/20; G06T 7/0004; G06T 7/11; G06T 2207/20076; G06T 2207/30112; G06T 1/00; G01V 5/20

See application file for complete search history.

(56) References Cited

U.S. PATENT DOCUMENTS

| | | | |
|---|---|---|---|
| 2007/0235658 A1 | 10/2007 | Zimdars et al. | |
| 2008/0025568 A1* | 1/2008 | Han | G06V 10/50 |
| | | | 382/103 |
| 2009/0022472 A1* | 1/2009 | Bronstein | H04N 5/783 |
| | | | 386/278 |
| 2016/0019427 A1* | 1/2016 | Martin | G06V 40/10 |
| | | | 382/103 |
| 2016/0335503 A1 | 11/2016 | Zhang et al. | |
| 2016/0364849 A1* | 12/2016 | Liu | G06T 7/0004 |
| 2017/0061258 A1* | 3/2017 | Chen | G06F 21/84 |
| 2017/0076224 A1* | 3/2017 | Munawar | G06N 3/045 |

(Continued)

*Primary Examiner* — Aaron W Carter

(74) *Attorney, Agent, or Firm* — Whitestone Law, PLLC

(57) ABSTRACT

There are provided systems and methods comprising obtaining an image of at least a part of an item, obtaining data informative of a pixel intensity of the part of the item in the image, obtaining first data informative of a pixel intensity in an image of a part of a first item associated with a prohibited material, wherein the part of the first item meets a similarity criterion with the part of the item, obtaining second data informative of a pixel intensity in an image of a part of a second item which is not associated with a prohibited material, wherein the part of the second item meets the similarity criterion with the part of the item, and using the first data, the second data and the data to determine whether the part of the item is associated with a concealed prohibited material in the image.

20 Claims, 12 Drawing Sheets

(56)  References Cited

U.S. PATENT DOCUMENTS

| | | | |
|---|---|---|---|
| 2018/0336672 A1* | 11/2018 | Perticone | G06T 7/73 |
| 2020/0084234 A1* | 3/2020 | Kair | G01V 5/271 |
| 2021/0357698 A1* | 11/2021 | Murasaki | G06T 7/00 |
| 2022/0114837 A1* | 4/2022 | Yamamoto | G06V 40/172 |
| 2023/0186456 A1* | 6/2023 | Marciano | G06T 7/0008 |
| | | | 382/141 |
| 2023/0306085 A1* | 9/2023 | Paglieroni | G06N 3/09 |
| 2023/0342924 A1* | 10/2023 | Champagne | G06T 7/155 |
| 2024/0046611 A1* | 2/2024 | Beiser | G06V 10/761 |
| 2024/0118450 A1* | 4/2024 | Feldman | G01V 5/226 |
| 2024/0249147 A1* | 7/2024 | Jaskie | G06N 3/08 |

* cited by examiner

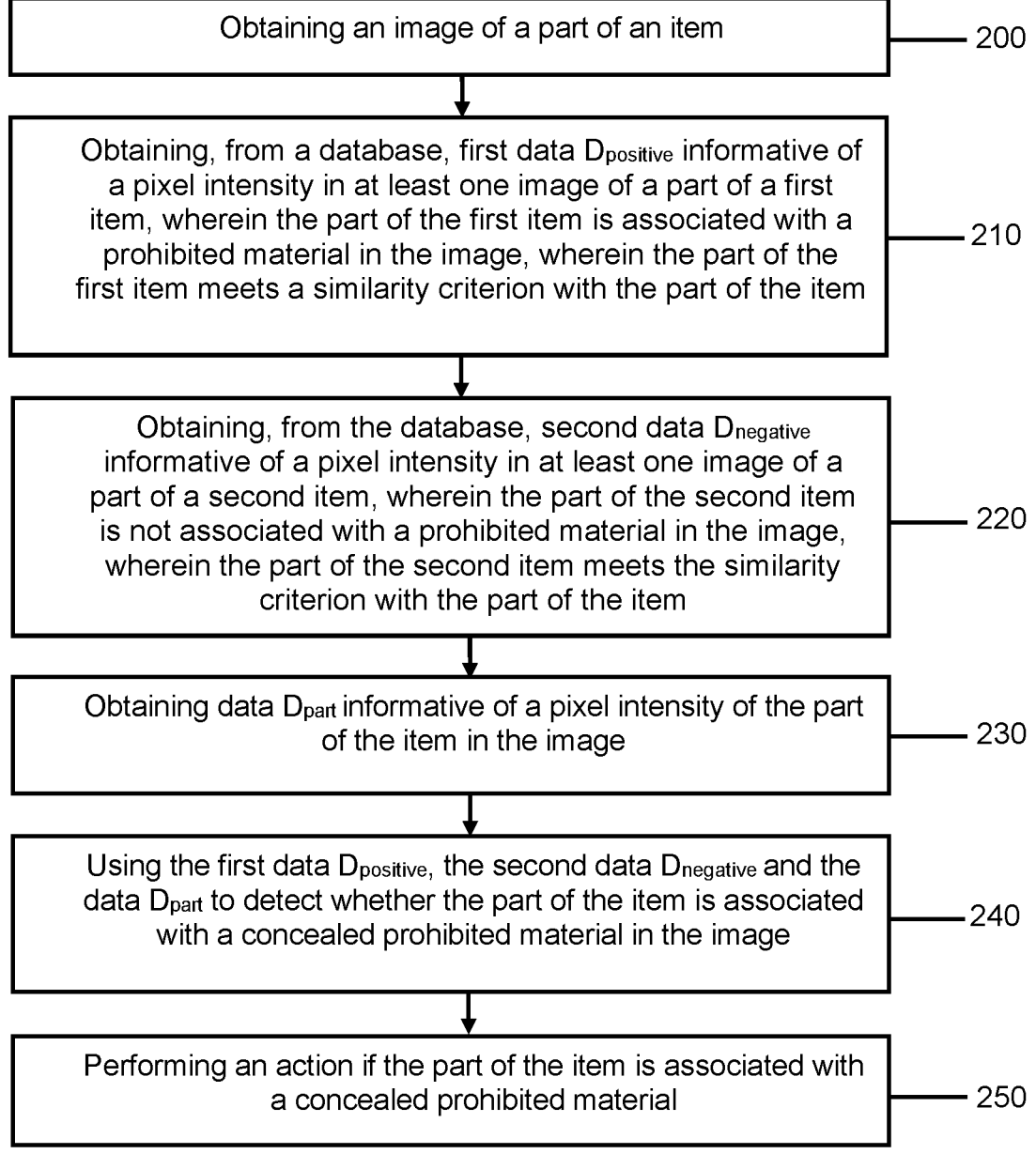

Obtaining an image of a part of an item — 200

Obtaining, from a database, first data $D_{positive}$ informative of a pixel intensity in at least one image of a part of a first item, wherein the part of the first item is associated with a prohibited material in the image, wherein the part of the first item meets a similarity criterion with the part of the item — 210

Obtaining, from the database, second data $D_{negative}$ informative of a pixel intensity in at least one image of a part of a second item, wherein the part of the second item is not associated with a prohibited material in the image, wherein the part of the second item meets the similarity criterion with the part of the item — 220

Obtaining data $D_{part}$ informative of a pixel intensity of the part of the item in the image — 230

Using the first data $D_{positive}$, the second data $D_{negative}$ and the data $D_{part}$ to detect whether the part of the item is associated with a concealed prohibited material in the image — 240

Performing an action if the part of the item is associated with a concealed prohibited material — 250

FIG. 2

Obtaining a map of probability informative, for each pixel (or group of pixels), of a probability that a prohibited material is present in the pixel (or group of pixels) — 500

Determining data $D_{number}$ informative of a number of pixels of the map for which the probability indicates presence of a prohibited material — 510

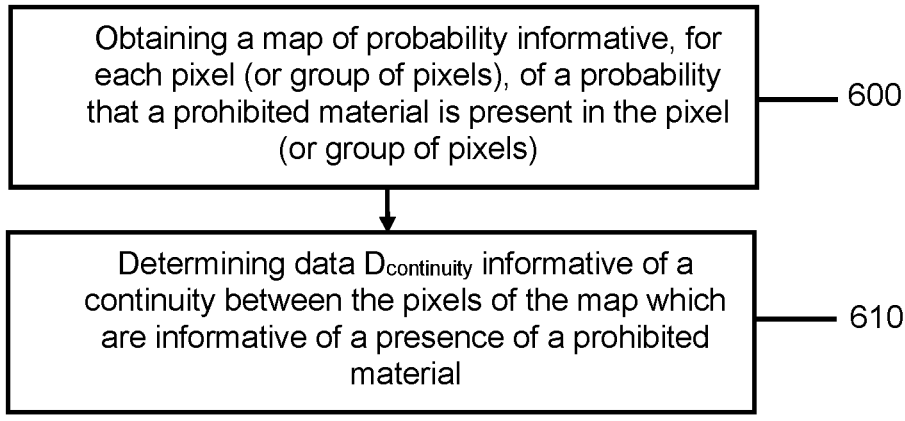

```
┌─────────────────────────────────────────┐
│  Obtaining a map of probability informative, for  │
│  each pixel (or group of pixels), of a probability │ ──── 600
│  that a prohibited material is present in the pixel │
│            (or group of pixels)           │
└─────────────────────────────────────────┘
                     │
                     ▼
┌─────────────────────────────────────────┐
│  Determining data $D_{continuity}$ informative of a  │
│  continuity between the pixels of the map which │ ──── 610
│  are informative of a presence of a prohibited │
│                material                    │
└─────────────────────────────────────────┘
```

FIG. 6A

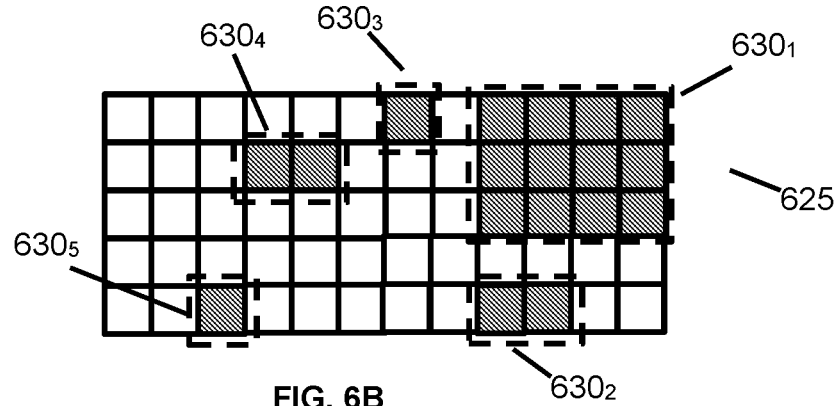

FIG. 6B

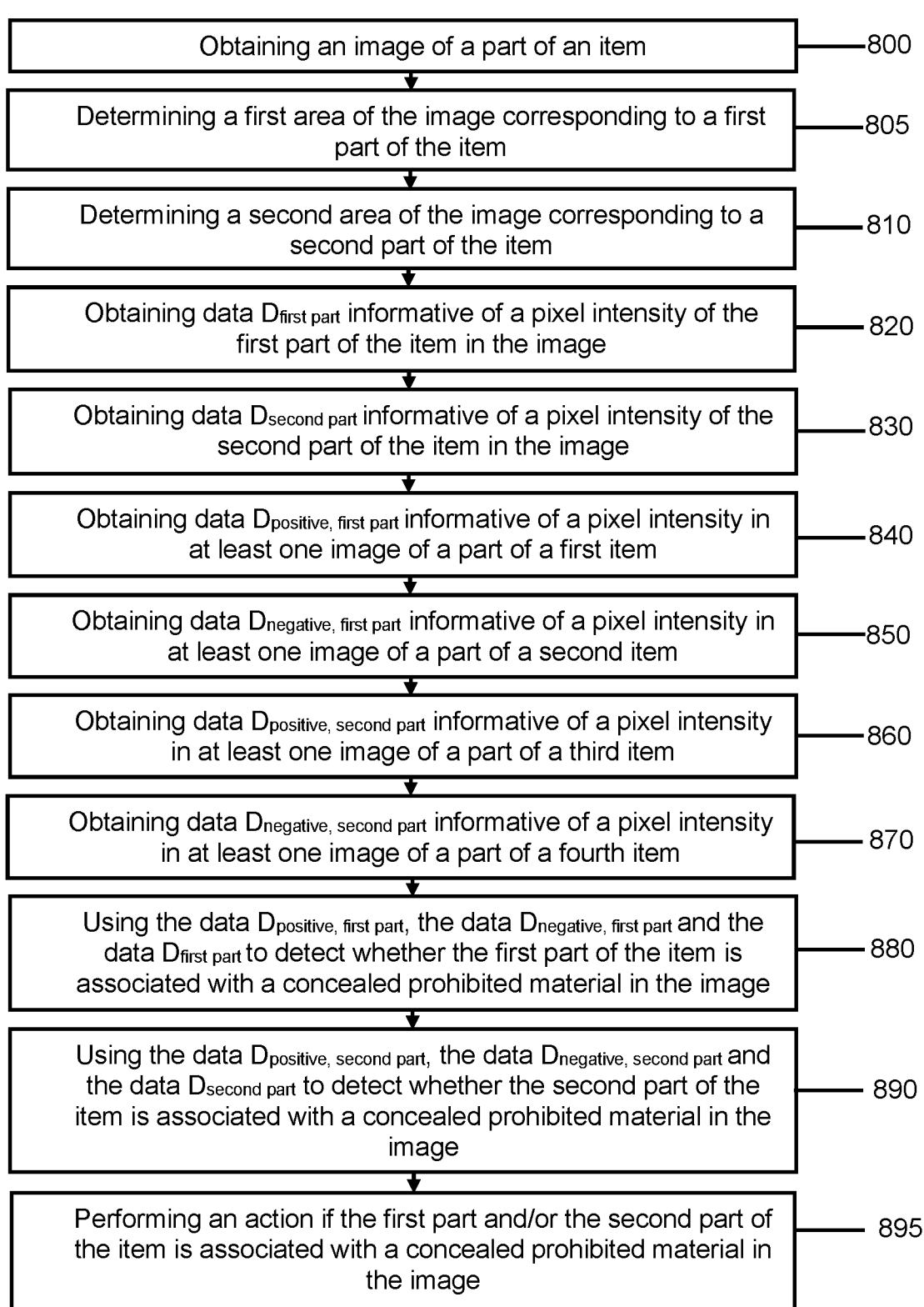

Obtaining an image of a part of an item ——— 800

Determining a first area of the image corresponding to a first part of the item ——— 805

Determining a second area of the image corresponding to a second part of the item ——— 810

Obtaining data $D_{first\ part}$ informative of a pixel intensity of the first part of the item in the image ——— 820

Obtaining data $D_{second\ part}$ informative of a pixel intensity of the second part of the item in the image ——— 830

Obtaining data $D_{positive,\ first\ part}$ informative of a pixel intensity in at least one image of a part of a first item ——— 840

Obtaining data $D_{negative,\ first\ part}$ informative of a pixel intensity in at least one image of a part of a second item ——— 850

Obtaining data $D_{positive,\ second\ part}$ informative of a pixel intensity in at least one image of a part of a third item ——— 860

Obtaining data $D_{negative,\ second\ part}$ informative of a pixel intensity in at least one image of a part of a fourth item ——— 870

Using the data $D_{positive,\ first\ part}$, the data $D_{negative,\ first\ part}$ and the data $D_{first\ part}$ to detect whether the first part of the item is associated with a concealed prohibited material in the image ——— 880

Using the data $D_{positive,\ second\ part}$, the data $D_{negative,\ second\ part}$ and the data $D_{second\ part}$ to detect whether the second part of the item is associated with a concealed prohibited material in the image ——— 890

Performing an action if the first part and/or the second part of the item is associated with a concealed prohibited material in the image ——— 895

Obtaining at least one image of an item which is of a given type, and which is used to conceal a prohibited material —1000

Generating D$_{positive}$ using the image(s) —1010

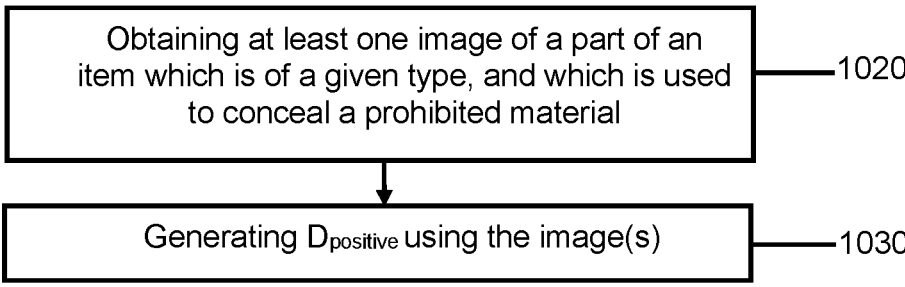

Obtaining at least one image of a part of an item which is of a given type, and which is used to conceal a prohibited material ——1020

Generating D$_{positive}$ using the image(s) ——1030

FIG. 10C

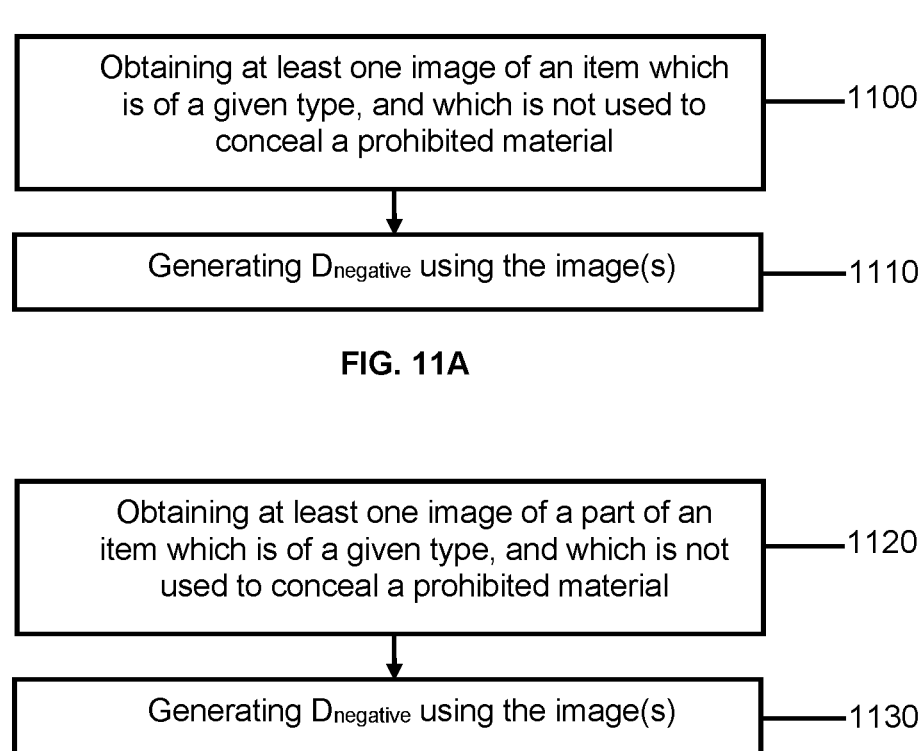

Obtaining at least one image of an item which is of a given type, and which is not used to conceal a prohibited material ——1100

Generating D$_{negative}$ using the image(s) ——1110

FIG. 11A

Obtaining at least one image of a part of an item which is of a given type, and which is not used to conceal a prohibited material ——1120

Generating D$_{negative}$ using the image(s) ——1130

FIG. 11B

DETECTION OF A CONCEALED PROHIBITED MATERIAL IN AN ITEM, USING IMAGE PROCESSING

TECHNOLOGICAL FIELD

The invention is in the field of detection of a prohibited material (such as an explosive material) concealed in an item, using image processing.

BACKGROUND

At a security checkpoint (for example in an airport), an acquisition device is used to acquire an image of an item carried by a person. The image can be verified by an operator and/or by a computerized system to detect the presence of a prohibited material, and in particular an explosive.

There is a need to propose new systems and methods to automatically detect a prohibited material (e.g. explosive material) concealed in an item.

GENERAL DESCRIPTION

In accordance with certain aspects of the presently disclosed subject matter, there is provided a system comprising a processor and memory circuitry (PMC) configured to obtain an image of at least a part of an item acquired by an acquisition device, obtain data $D_{part}$ informative of a pixel intensity of the part of the item in the image, obtain first data $D_{positive}$ informative of a pixel intensity in at least one image of a part of a first item, wherein the part of the first item is associated with a prohibited material in the image, wherein the part of the first item meets a similarity criterion with the part of the item, obtain second data $D_{negative}$ informative of a pixel intensity in at least one image of a part of a second item, wherein the part of the second item is not associated with a prohibited material in the image, wherein the part of the second item meets the similarity criterion with the part of the item, and use the first data $D_{positive}$, the second data $D_{negative}$ and the data $D_{part}$ to determine whether the part of the item is associated with a concealed prohibited material in the image.

In addition to the above features, the system according to this aspect of the presently disclosed subject matter can optionally comprise one or more of features (i) to (xviii) below, in any technically possible combination or permutation:

i. the first data $D_{positive}$ includes, for each given pixel intensity value of a plurality of different pixel intensity values in the at least one image of the part of the first item, a probability that this given pixel intensity value is informative of a prohibited material, and/or the second data $D_{negative}$ includes, for each given pixel intensity value of a plurality of different pixel intensity values in the at least one image of the part of the second item, a probability that this given pixel intensity value is not informative of a prohibited material;

ii. the first data $D_{positive}$ is informative of a frequency distribution of pixel intensity in the at least one image of the part of the first item, and/or the second data $D_{negative}$ is informative of a frequency distribution of pixel intensity in the at least one image of the part of the second item;

iii. the image of the part of the item comprises a plurality of groups of one or more pixels informative of the part of the item, wherein the system is configured to, for each group of one or more pixels of the plurality of groups, use the first data $D_{positive}$ and pixel intensity of the one or more pixels of the group to determine a probability $P_{positive/pixel}$ that the group of one or more pixels is informative of a prohibited material, and use the second data $D_{negative}$ and pixel intensity of the one or more pixels of the group to determine a probability $P_{negative/pixel}$ that the group of one or more pixels is informative of a prohibited explosive material;

iv. determining $P_{positive/pixel}$ includes extracting a first probability associated with the pixel intensity of the one or more pixels of the group in $D_{positive}$ using said first probability to determine $P_{positive/pixel}$, and/or determining $P_{negative/pixel}$ includes extracting a second probability associated with the pixel intensity of the one or more pixels of the group in $D_{negative}$ and using said second probability to determine $P_{negative/pixel}$;

v. the system is configured to, for said each group of one or more pixels informative of the part of the item in the image, use the probability $P_{positive/pixel}$ and the probability $P_{negative/pixel}$ to determine an aggregated probability that the group of one or more pixels is informative of a prohibited material;

vi. the system is configured to, for said each group of one or more pixels informative of the part of the item in the image: perform a comparison between the aggregated probability and a threshold, determine whether the group of one or more pixels is informative of a prohibited material based on a result of the comparison;

vii. the system is configured to determine at least one of: data $D_{number}$ informative of a number of pixels of the image which are informative of a presence of a prohibited material, or data $D_{shape}$ informative of a shape of pixels of the image which are informative of a presence of a prohibited material, or data $D_{continuity}$ informative of a continuity between pixels of the image which are informative of a presence of a prohibited material, and use at least one of $D_{number}$ or $D_{shape}$ or $D_{continuity}$ to determine whether the part of the item is associated with a concealed prohibited material in the image;

viii. the image of the part of the item comprises a plurality of groups of one or more pixels informative of the part of the item, wherein the system is configured to, for each group of one or more pixels of the plurality of group, use the first data $D_{positive}$, the second data $D_{negative}$ and the data $D_{part}$ to generate for each group of one or more pixels informative of the part of the item in the image, a probability that the group of one or more pixels comprises a prohibited material, thereby obtaining a map of probability, and use the map of probability to determine whether the part of the item is associated with a concealed prohibited material in the image;

ix. the system is configured to determine data $D_{number}$ informative of a number of pixels of the map associated with a probability indicative of a presence of a prohibited material and use data $D_{number}$ to determine whether the part of the item is associated with a concealed prohibited material in the image;

x. the system is configured to determine data $D_{shape}$ informative of a shape of pixels of the map associated with a probability indicative of a presence of a prohibited material and use $D_{shape}$ to determine whether the part of the item is associated with a concealed prohibited material in the image;

xi. the system is configured to determine data $D_{continuity}$ informative of a continuity between pixels of the map associated with a probability indicative of a presence of a prohibited material, and use $D_{continuity}$ to determine whether the part of the item is associated with a concealed prohibited material in the image;

xii. the system is configured to obtain an image of an item acquired by an acquisition device, determine a first area of the image corresponding to a first part of the item, determine a second area of the image corresponding to a second part of the item, wherein the second part is different from the first part, obtain data $D_{first\,part}$ informative of a pixel intensity of the first part of the item in the image, obtain data $D_{second\,part}$ informative of a pixel intensity of the second part of the item in the image, obtain data $D_{positive,\,first\,part}$ informative of a pixel intensity in at least one image of a part of a first item, wherein the part of the first item is associated with a prohibited material in the image, wherein the part of the first item meets a similarity criterion with the first part of the item, obtain data $D_{negative,\,first\,part}$ informative of a pixel intensity in at least one image of a part of a second item, wherein the part of the second item is not associated with a prohibited material in the image, wherein the part of the second item meets the similarity criterion with the first part of the item, obtain data $D_{positive,\,second\,part}$ informative of a pixel intensity in at least one image of a part of a third item, wherein the part of the third item is associated with a prohibited material in the image, wherein the part of the third item meets the similarity criterion with the second part of the item, obtain data $D_{negative,\,second\,part}$ informative of a pixel intensity in at least one image of a part of a fourth item, wherein the part of the fourth item is not associated with a prohibited material in the image, wherein the part of the fourth item meets the similarity criterion with the second part of the item, use the data $D_{positive,\,first\,part}$, the data $D_{negative,\,first\,part}$ and the data $D_{first\,part}$ to detect whether the first part of the item is associated with a concealed prohibited material in the image, and use the data $D_{positive,\,second}$ part, the data $D_{negative,\,second\,part}$ and the data $D_{second\,part}$ to detect whether the second part of the item is associated with a concealed prohibited material in the image;

xiii. the prohibited material is an explosive material;

xiv. the image of the at least part of the item has been acquired while the part of the item was located within a baggage;

xv. the PMC is operatively coupled to a database, storing, for at least one type of prohibited material, and for each given type of a plurality of different types of parts of items, at least one of $D_{positive}$ informative of a pixel intensity distribution in at least one image of a part of a first item, wherein the part of the first item is associated with a prohibited material in the image, wherein the part of the first item is of the given type, or $D_{negative}$ informative of a pixel intensity distribution in at least one image of a part of a second item, wherein the part of the second item is not associated with a prohibited material in the image, wherein the part of the second item is of the given type;

xvi. $D_{positive}$ is informative of a pixel intensity in a plurality of images, wherein each given image of the plurality of images includes a part of a given first item, wherein the part of the given first item is associated with a prohibited material in the given image, wherein the part of the given item meets a similarity criterion with the part of the item, wherein at least two images of the plurality of images are informative of a part of a different first item, and/or $D_{negative}$ is informative of a pixel intensity distribution in a plurality of images, wherein each given image of the plurality of images includes a part of a given second item, wherein the part of the given second item is not associated with a prohibited material in the given image, wherein the part of the given second item meets a similarity criterion with the part of the item, wherein at least two images of the plurality of images are informative of a part of a different second item;

xvii. the first data $D_{positive}$ includes, for each given pixel intensity value of a plurality of different pixel intensity values, a frequency of occurrence of this given pixel intensity value in the plurality of images, and/or the second data $D_{negative}$ includes, for each given pixel intensity value of a plurality of different pixel intensity values, a frequency of occurrence of this given pixel intensity value in the plurality of images; and xviii. the system is configured to obtain a plurality of images of at least a part of an item acquired by an acquisition device, wherein the plurality of images differs from each other by at least one acquisition parameter, obtain, for each given image of the plurality of images, data $D_{part}$ informative of a pixel intensity of the part of the item in the given image, obtain first data $D_{positive}$ informative of a pixel intensity in at least one image of a part of a first item, wherein the part of the first item is associated with a prohibited material in the image, wherein the part of the first item meets a similarity criterion with the part of the item, obtain second data $D_{negative}$ informative of a pixel intensity in at least one image of a part of a second item, wherein the part of the second item is not associated with a prohibited material in the image, wherein the part of the second item meets the similarity criterion with the part of the item, and use the first data $D_{positive}$, the second data $D_{negative}$ and the data $D_{part}$ to determine whether the part of the item is associated with a concealed prohibited material in the plurality of images.

In accordance with certain aspects of the presently disclosed subject matter, there is provided a method comprising, by a processor and memory circuitry (PMC), obtaining an image of at least a part of an item acquired by an acquisition device, obtaining data $D_{part}$ informative of a pixel intensity of the part of the item in the image, obtaining first data $D_{positive}$ informative of a pixel intensity in at least one image of a part of a first item, wherein the part of the first item is associated with a prohibited material in the image, wherein the part of the first item meets a similarity criterion with the part of the item, obtaining second data $D_{negative}$ informative of a pixel intensity in at least one image of a part of a second item, wherein the part of the second item is not associated with a prohibited material in the image, wherein the part of the second item meets the similarity criterion with the part of the item, and using the first data $D_{positive}$, the second data $D_{negative}$ and the data $D_{part}$ to determine whether the part of the item is associated with a concealed prohibited material in the image.

In addition to the above features, the method according to this aspect of the presently disclosed subject matter can optionally comprise and/or implement one or more of features (i) to (xviii) as described with respect to the system above.

In accordance with certain aspects of the presently disclosed subject matter, there is provided a non-transitory storage device readable by a processor and memory circuitry, tangibly embodying a program of instructions executable by the processor and memory circuitry to perform operations as described with reference to the method above.

According to some embodiments, the proposed solution improves accuracy of detection of a concealed prohibited material, such as an explosive material.

According to some embodiments, the proposed solution enables detection of a prohibited material concealed using various types of objects (a laptop, a cellular phone, etc.).

According to some embodiments, the proposed solution enables detection of a prohibited material irrespective of the material's shape. Indeed, a prohibited material (such as an explosive) may be concealed in objects using different techniques, thereby appearing in the images of the objects with various different shapes.

According to some embodiments, the proposed solution enables detection in real time or quasi real time of a prohibited material (such as an explosive) concealed within an item.

According to some embodiments, the proposed solution does not require using a large training set of data for detecting a prohibited material, contrary to solutions which require training of machine learning networks.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2 illustrates a flow chart of an embodiment of a method of detecting a prohibited material in an image of a part of an item;

FIG. 6A illustrates a flow chart of an embodiment of a method of using a continuity between positive pixels in a map of probability informative of a presence of a prohibited material;

FIG. 6B illustrates a non-limitative example of the method of FIG. 6A;

FIG. 8 illustrates a flow chart of an embodiment of a method of detecting a prohibited material in an image of an item, in which the item is divided into a plurality of areas;

FIG. 10C illustrates a flow chart of an embodiment of a method of generating data informative of a pixel intensity frequency distribution of one or more images of parts of items associated with a prohibited material;

FIG. 11A illustrates a flow chart of an embodiment of a method of generating data informative of a pixel intensity frequency distribution of one or more images of items which are not associated with a prohibited material;

FIG. 11B illustrates a flow chart of an embodiment of a method of generating data informative of a pixel intensity frequency distribution of one or more images of parts of items which are not associated with a prohibited material.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

The term "processor and memory circuitry" (PMC) as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), a graphics processing unit (GPU), etc.) capable of executing various data processing operations.

It can encompass a single processor or multiple processors, which may be located in the same geographical zone, or may, at least partially, be located in different zones and may be able to communicate together.

Unless specifically stated otherwise, as apparent from the following discussions, it is appreciated that throughout the specification discussions utilizing terms such as "obtaining", "using", "determining", "performing", or the like, refer to the action(s) and/or process(es) of a processor and memory circuitry that manipulates and/or transforms data into other data, said data represented as physical, such as electronic, quantities and/or said data representing the physical objects.

In the specification, reference will be made to "prohibited material". This includes (but is not limited to) explosive materials, drugs, etc. The prohibited material can include a material considered as prohibited at a control or security checkpoint (according to rules set e.g. by an administrator of the security checkpoint and/or by law) and should therefore be detected.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1:
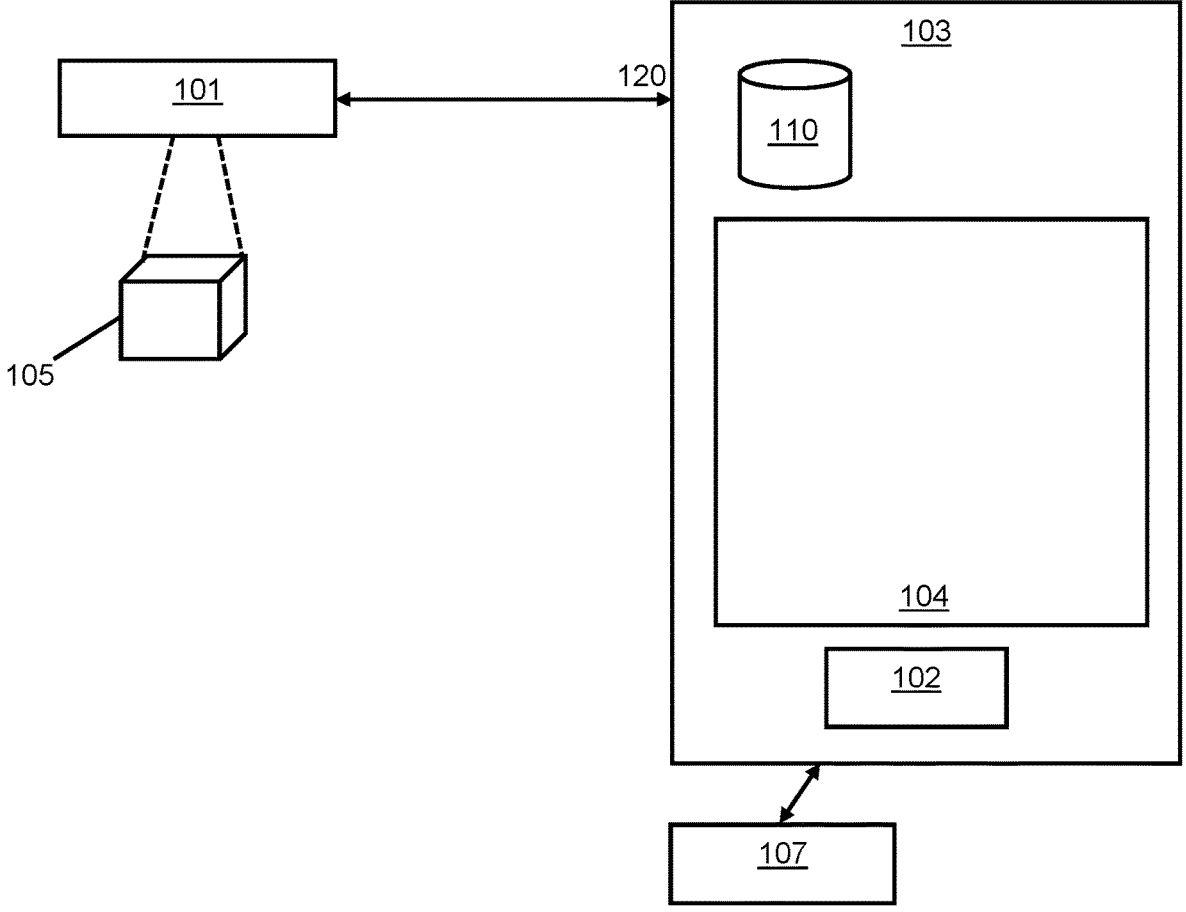
FIG. 1 illustrates an architecture of a system according to some embodiments of the invention.

Attention is drawn to FIG. 1. FIG. 1 illustrates a system 100 which can be used at a control or security checkpoint, such as in an airport. This is however not limitative, and the system 100 can be used in various other applications.

FIG. 1 illustrates an acquisition device 101, which is operative to acquire an image of an item 105.

The acquisition device 101 includes for example an X-ray acquisition device, a scanner, a computerized tomography (CT) scan, etc. (this is however not limitative).

Item 105 includes for example an electronic device (e.g. a laptop, a cellular phone, etc.) or other object which can be used to conceal a prohibited material. In some embodiments, the item 105 is located within baggage, and an image of the baggage including the item 105 is acquired.

The acquisition device 101 is operatively connected to a computer-implemented system 103. System 103 can be part of the acquisition device 101, or external to the acquisition device 101, or partially part of the acquisition device 101 and partially external to it. System 103 is operative to receive an image 120 of the item 105 (or data informative of the image 120) acquired by the acquisition device 101.

System 103 includes a processor and memory circuitry (PMC) 104. PMC 104 is configured to provide processing necessary for operating system 103, as further detailed in the various embodiments described hereinafter, and comprises a processor (not shown separately) and a memory (not shown separately). System 103 can be used to perform various methods described hereinafter, such as (but not limited to) the methods described with reference to FIGS. 2, 4A, 4B, 4C, 5, 6A, 7, 8, 10A, 10B, 10C, 11A and 11B.

In FIG. 1, PMC 104 is operatively connected to a hardware-based input interface 102 and to a database 110. The interface 102 (e.g. a keyboard) can be used e.g. by an operator to interact with system 103.

Upon processing the image 120, system 103 can send data informative of the output of the processing to a device 107 enabling a visual and/or audio representation of the processing. Device 107 includes e.g. a screen and/or a loudspeaker. In some embodiments, system 103 can trigger an alert and/or send instructions to another device to trigger an alert.

It is noted that at least part of system 103 illustrated in FIG. 1A can be implemented in a distributed computing environment, in which the aforementioned functional modules shown in FIG. 1 can be distributed over several local and/or remote devices and can be linked through a communication network.

Attention is now drawn to FIG. 2.

Figure 3A:
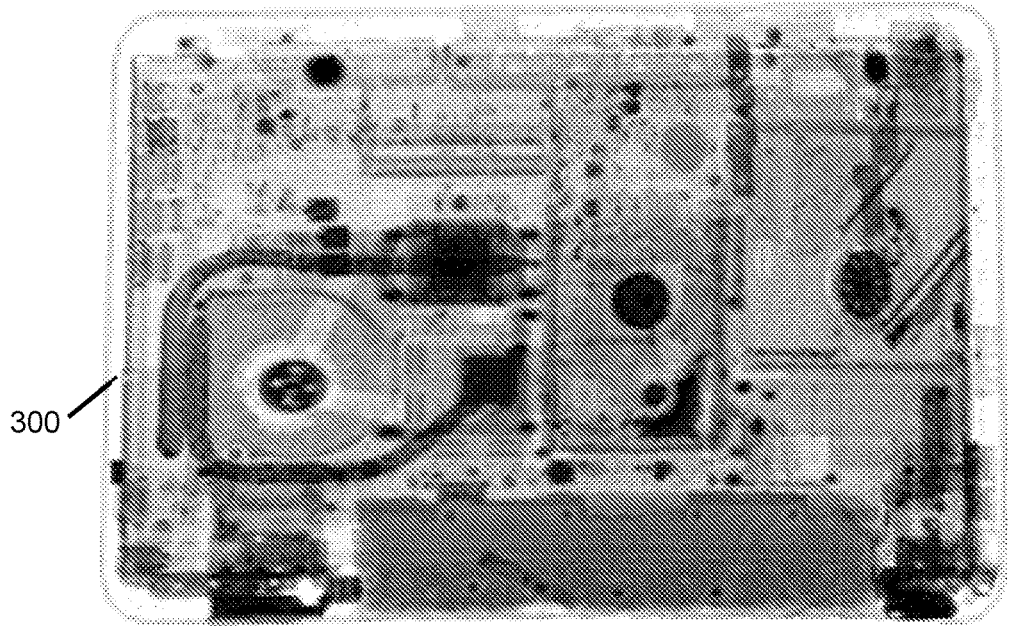
FIG. 3A illustrates a non-limitative example of an item (a laptop) which can be used to conceal a prohibited material.

The method depicted in FIG. 2 includes obtaining (operation 200) an image of at least a part of an item (see e.g. reference 105 in FIG. 1) acquired by an acquisition device (see e.g. reference 101 in FIG. 1). FIG. 3A illustrates a non-limitative example of an item 300 (a laptop in this example). As further explained hereinafter, the part of the item can correspond to the item itself (e.g. an image of the laptop is obtained), or to a fraction/specific area of the item. For example, an image of a specific area of the laptop is obtained, such as the area which includes the battery. Note that an image of a specific area of an item can be directly acquired by the acquisition device, or an image of the item can be acquired which is then processed to obtain the image of the specific area (as explained with reference to FIG. 8).

The method further includes obtaining (operation 210), from a database (e.g. database 110 in FIG. 1), first data $D_{positive}$ informative of a pixel intensity in at least one image of a part of a first item (e.g. pixel intensity frequency distribution).

A method of generating $D_{positive}$ will be described with reference to FIGS. 10A, 10B and 10C.

The part of the first item is associated with a prohibited material in the image. In other words, the image is a "positive" example, in which the part of the first item has been used to conceal a prohibited material. The part of the first item is therefore "associated" with a prohibited material in the image. Note that in some embodiments the prohibited material can be artificially inserted (using an image processing algorithm) in the image of the part of the first item.

Concealing of a prohibited material using a part of an item can be performed using various methods. The prohibited material can be e.g. concealed within the part of the item (for example within cracks present in the part of the item). The prohibited material can be also located in the same area of a concealing material of the part of the item (e.g. under or above a metallic material of the part of the item), which attenuates the electromagnetic waves transmitted by the acquisition device 101 (e.g. X-rays).

Note that in an X-ray image, there is no real difference between a prohibited material located "above" a concealing material, "within" a concealing material, or "underneath" a concealing material, since in all cases the X-rays are attenuated by the concealing material before reaching the detector of the X-ray machine, thereby making the prohibited material less visible in the image. Of course, malicious persons tend to conceal the prohibited material within the part of the item (e.g. within cracks of the item), to prevent visual identification by an operator at the security checkpoint.

In an image acquired by the acquisition device, each pixel is associated with a pixel intensity. In some embodiments, the pixel intensity is a grey level intensity. In some embodiments, the pixel intensity can include one or more values, each value being associated with a different color channel (e.g. Red, Green, or Blue, in an RGB image). Indeed, some acquisition devices (e.g. X-ray devices) can provide a colored image.

$D_{positive}$ can be informative of the frequency distribution of pixel intensity in in the image of the part of the first item (or in a plurality of images of the first item, or in a plurality of images of a plurality of parts of different first items). In particular, $D_{positive}$ can be informative of the frequency distribution of pixel intensity values in the image of the part of the first item (or in a plurality of images of the first item, or in a plurality of images of a plurality of parts of different first items).

$D_{positive}$ can include e.g. a representation (such as, but not limited to, a histogram) which includes, for each given pixel intensity value of a plurality of different pixel intensity values present in the image of the part of the first item, a probability that this given pixel intensity value is informative of a prohibited material.

In particular, for each given pixel intensity value, a frequency (frequency of occurrence/presence) of this given pixel intensity value in the image of the part of the first item (or in a plurality of images of the first item, or in a plurality of images of a plurality of parts of different first items) can be determined.

Since the image of the part of the first item is a "positive" image which is informative of a concealed prohibited material, the frequency of this given pixel intensity value in the histogram represents the likelihood that a pixel with this given pixel intensity value (in an image of a part of an item which meets a similarity criterion with the part of the first item), corresponds to a pixel in which a prohibited material is present.

Note that the frequency of each given pixel intensity value can be obtained e.g. by determining a ratio between the number of times a given pixel intensity value appears and the total number of pixels. This is not limitative.

It is expected that the presence of a prohibited material will cause the pixel intensity distribution to be more focused on specific pixel intensity ranges and/or specific colors, than the pixel intensity distribution of an item which is free of prohibited material. This can be due to the fact that the prohibited material (such as an explosive material) includes an organic material. In a non-limitative example, the pixel intensity values are more focused on orange and/or green colors. This is not limitative.

In some embodiments, $D_{positive}$ can be informative of the frequency distribution of pixel intensity values (expressed in grey level or in the RGB representation) in the image of the part of the first item (or in a plurality of images of the first item, or in a plurality of images of a plurality of parts of different first items).

In some embodiments, it possible to use $D_{positive}$ informative of a pixel intensity which is expressed in a representation different from the grey level representation or the RGB representation: for example, the pixel intensity can be expressed using the HSL (Hue, Saturation, And Lightness) representation, or the HSV (Hue Saturation Value) representation (one or more channels of these representations can be used).

In some embodiments, $D_{positive}$ is informative of a frequency distribution of values calculated as a function of the pixel intensity of each pixel (e.g. a linear combination of green, red and blue pixel intensity values of each pixel).

Figure 3B:
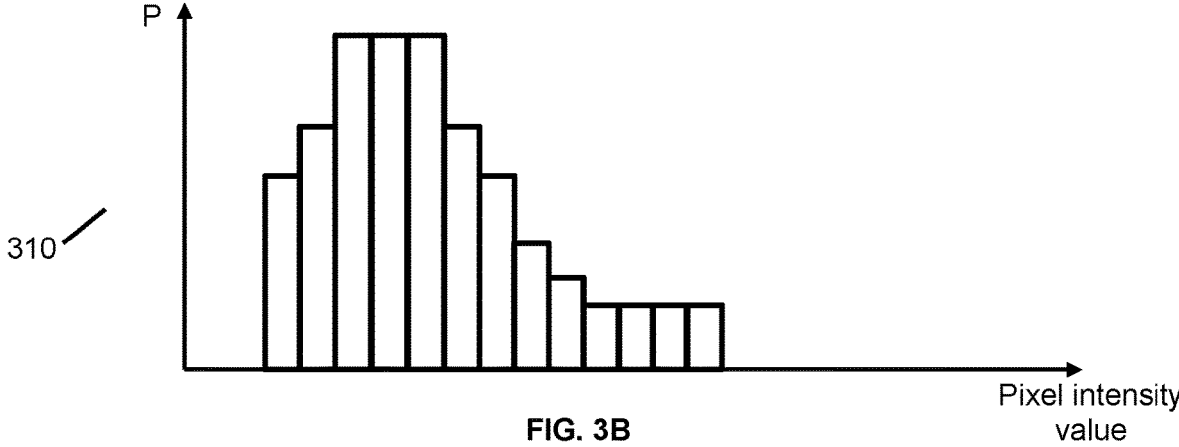
FIG. 3B illustrates a non-limitative example of a pixel intensity frequency distribution of a part of an item.

A non-limitative example of $D_{positive}$ is depicted in FIG. 3B, which illustrates a frequency distribution 310 of pixel intensity of a part of an item, for a given channel (e.g. red or blue or green channel).

For each pixel intensity value (e.g. from 0 to 256), a corresponding probability "P" is depicted. The higher the probability, the higher the likelihood that such pixel intensity value is informative of a prohibited material.

FIG. 3B depicts $D_{positive}$ in a two-dimensional representation. This is not limitative. In some embodiments, $D_{positive}$ can be represented using a multi-dimensional representation. Indeed, each pixel intensity value can be represented by a vector (including two or three values, one per color channel in RGB or HSL), and a corresponding probability is associated with each pixel intensity vector value.

The part of the first item meets a similarity criterion with the part of the item (which has been acquired by the acquisition device). The similarity criterion can define that the part of the first item and the part of the item are of the same type (e.g. same object type). For example, assume that the part of the item is the laptop itself, then the part of the first item is also a laptop, thereby meeting the similarity criterion with the part of the item. The laptop selected as the first item has not necessarily been manufactured by the same manufacturer as the laptop corresponding to the item, although this can be the case.

The similarity criterion can be pre-tuned or defined e.g. by an operator. In some embodiments, the similarity criterion can require a similarity, not only in the type of the items, but also in their size or other relevant features (e.g. if a large laptop has been acquired, the similarity criterion can define that data $D_{positive}$ associated with a large laptop is also obtained).

As explained hereinafter, in some embodiments, the part of the item can correspond to a specific part of the item. For example, the part of the item corresponds to the area of the laptop which includes the battery. In this case, the part of the first item which meets the similarity criterion with the part of the item is also an area of a laptop which includes the battery.

In order to determine the type of the part of the item present in the image acquired at operation 200, an object detection algorithm can be used to identify the type of the part of the item. Examples of object detection algorithms include a trained machine learning network (deep neural network), YOLO ("You Only Look Once"), etc. The machine learning network can be trained using supervised learning (which uses images labelled by an operator).

The object detection algorithm can also provide other features informative of the part of the item (e.g. shape, size, etc.).

Once the type of the part of the item is known (or other relevant features that are required to determine similarity according to the similarity criterion), it is possible to select, in the database (see reference 110), data $D_{positive}$ associated with at least one image of a part of a first item which matches the part of the item according to the similarity criterion.

In some embodiments, and as explained hereinafter, $D_{positive}$ is informative of a pixel intensity in a plurality of images: each given image includes a part of a given first item associated with a prohibited material in the given image (the given first items can differ from each other in the plurality of images). For each given image, the part of the given first item meets the similarity criterion with the part of the item which is under analysis. For example, if a laptop has been acquired, then $D_{positive}$ is generated using a plurality of laptop images (e.g. from different laptops), each laptop image being informative of a concealed prohibited material.

In some embodiments, images of items (e.g. laptops) of different brands and/or of different sizes can be used to generate $D_{positive}$.

In some embodiments, for each given first item, a plurality of different images of the part of the given first item can be used to generate $D_{positive}$. The images can differ e.g. by the observation/illumination angle of the acquisition device, the size of the part of the given first item in the image (which depends inter alia on the distance to the acquisition device), etc.

In some embodiments, for each given first item, a plurality of different images of the part of the given first item is used, in which the position and/or the type of prohibited material is changed to generate $D_{positive}$.

The method of FIG. 2 further includes (operation 220), obtaining, from the database (see reference 110), second data $D_{negative}$ informative of a pixel intensity in at least one image of a part of a second item (e.g. pixel intensity frequency distribution). A method of generating $D_{negative}$ will be described with reference to FIGS. 11A and 11B.

The part of the second item is not associated with a prohibited material in the image, since the part of the second item has not been used to conceal a prohibited material. The image has also not been processed to artificially insert a concealed prohibited material. In other words, the image of the part of the second item corresponds to a "negative" example, in which a prohibited material is absent.

The part of the second item meets the similarity criterion with the part of the item. Reference can be made to the description of the similarity criterion appearing above, which applies herein.

For example, if the part of the item is the laptop itself, then the part of the second item is also a laptop. If the part of the item is a battery area of a laptop, then the part of the second item is also a battery area of a laptop.

Note that although the first item (or a part thereof) and the second item (or a part thereof) each meet the similarity criterion with the item (or a part thereof), they may have been manufactured by different manufacturers (e.g. the item is a laptop of brand X, the first item is a laptop of brand Y, and the second item is a laptop of brand Z).

In some embodiments, the first item and the second item are the same item (e.g. same laptop), but they differ in that the first item includes a prohibited material, whereas the second item does not include a prohibited material.

$D_{negative}$ is similar to $D_{positive}$ except that $D_{negative}$ is generated based on one or more "negative" samples (without prohibited material), whereas $D_{positive}$ is generated based on "positive" samples (with prohibited material).

$D_{negative}$ can be informative of the frequency distribution of pixel intensity values in the image of the part of the second item (or in a plurality of images of the part of the second item, or in a plurality of images of parts of different second items).

$D_{negative}$ includes e.g. a representation (such as, but not limited to, a histogram) which includes, for each given pixel intensity value of a plurality of different pixel intensity values present in the image of the part of the second item, a probability that this given pixel intensity value is informative of a prohibited material.

In particular, for each given pixel intensity value, a frequency (frequency of occurrence) of this given pixel intensity value in the image of the part of the second item (or in a plurality of images of the second item, or in a plurality of images of a plurality of parts of different second items) can be determined.

Since the image of the part of the second item is a "negative" image which is not informative of a concealed prohibited material, the frequency of this given pixel intensity value in the histogram represents the likelihood that a pixel with this given pixel intensity value (in an image of a part of an item which meets a similarity criterion with the part of the second item), corresponds to a pixel in which a prohibited material is present (or absent, depending on the definition of the probability).

In some embodiments, $D_{negative}$ can be informative of the frequency distribution of pixel intensity values (expressed in grey level or in the RGB representation) in the image of the part of the second item (or in a plurality of images of the second item, or in a plurality of images of a plurality of parts of different second items).

In some embodiments, it possible to use $D_{negative}$ informative of a pixel intensity which is expressed in a representation different from the grey level representation or the RGB representation: for example, the pixel intensity can be expressed using the HSL (Hue, Saturation, And Lightness) representation, or the HSV (Hue Saturation Value) representation (one or more channels of these representations can be used).

In some embodiments, $D_{negative}$ is informative of a frequency distribution of values calculated as a function of the pixel intensity of each pixel (e.g. a linear combination of green, red and blue pixel intensity values of each pixel).

The method of FIG. 2 further includes obtaining (operation 230) data $D_{part}$ informative of a pixel intensity of the part of the item in the image. This can include extracting the pixel intensity of the pixels of the part of the item in the image. $D_{part}$ can also include the position of each pixel.

As mentioned above, the pixel intensity (used to generate $D_{part}$) can be expressed using various representations (e.g. grey level representation, RGB representation, HSL representation, HSV representation, a representation which relies, for each pixel, on a function of the different pixel intensity values of this pixel, etc.).

The method of FIG. 2 further includes (operation 240) using the first data $D_{positive}$, the second data $D_{negative}$ and the data $D_{part}$ to detect whether the part of the item is associated with a concealed prohibited material in the image. In other words, it is possible to detect whether the part of the item has been used to conceal a prohibited material, such as an explosive material. In order to be comparable, $D_{part}$, $D_{positive}$ and $D_{negative}$ are generated using the same pixel intensity representation.

Figure 4A:
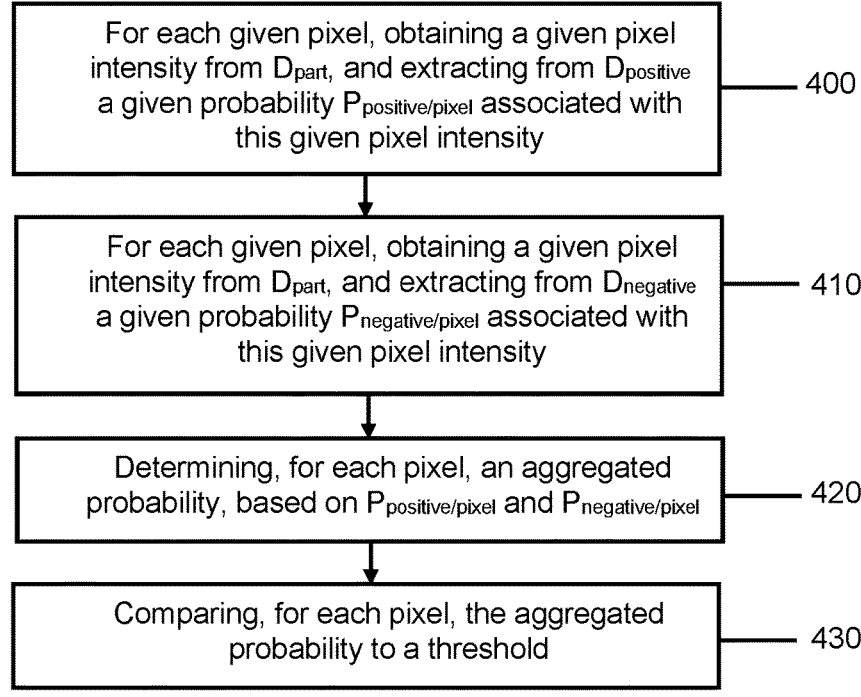
FIG. 4A illustrates a flow chart of an embodiment of a method of performing operation 240 in FIG. 2.

$D_{positive}$ and $D_{negative}$ can be used as a reference to which the data $D_{part}$ can be compared. This comparison can be used to determine whether the part of the item is associated with a concealed prohibited material. FIG. 4A depicts a method of using $D_{part}$, $D_{positive}$ and $D_{negative}$ to determine presence of a concealed prohibited material.

Note that the method of FIG. 2 can be performed to detect different types of prohibited materials (for example, an explosive material and drugs). In this case, it is possible to obtain $D_{positive/first\ material}$ and $D_{negative/first\ material}$ for a first type of prohibited material (e.g. explosives), and $D_{positive/second\ material}$ and $D_{negative/second\ material}$ for a second (different) type of prohibited material (e.g. drugs). Operation 240 is then performed separately for each type of prohibited material: for the first type of prohibited material, $D_{part}$ is compared to $D_{positive/first}$ material and $D_{negative/first\ material}$, and for the second type of prohibited material $D_{part}$ is compared to $D_{positive/second\ material}$ and $D_{negative/second\ material}$. Based on this comparison, it is detected whether the part of the item conceals the first type of prohibited material and/or the second type of prohibited material.

If it is detected the part of the item is associated with a concealed prohibited material, an action can be performed (operation 250). Typically, performing an action can include raising an alert. The alert can include e.g. a textual alert and/or visual alert and/or audio alert. The alert can be displayed e.g. on a screen, and/or transmitted to an electronic device (e.g. computer, smartphone) of one or more operators. In some embodiments, raising an alert can include sending a command to another system which can trigger the alert.

In some embodiments, performing an action can include associating, in a database, identity data of the item's owner with a malicious label.

In some embodiments, performing an action can include triggering a system to destroy or annihilate the item and/or the detected prohibited material.

In some embodiments, the action and/or alert can be different, depending on the type of prohibited material.

In some embodiments, the action and/or alert can include instructing a conveyor (of the lane) to move the item to a separate area for manual inspection.

In some embodiments, the action and/or alert can include sending an instruction (e.g. to the acquisition device) to immediately stop the conveyor, while the item is still inside the tunnel.

In some embodiments, the method can include outputting additional data informative of the prohibited material. This data can include location of the prohibited material in the image.

In some embodiments, the method can output a modified image in which location of the prohibited material is emphasized (using e.g. device 107), thereby facilitating manual inspection of the item by an operator. For example, a bounding box is added on the image and indicates presence of a prohibited material.

According to some embodiments, the image obtained at operation 200 is the image of the part of the item when the part of the item is located within a container. For example, an image of a baggage containing the laptop is obtained. In this case, the method can include a pre-processing operation in which the area of the laptop is identified in the image. This pre-processing operation can be performed using an objected detection algorithm (e.g. a trained deep neural network). Then, the pixel intensity distribution of this area can be extracted, as in operation 230. The other operations of FIG. 2 (210, 220, 240 and 250) can be performed similarly.

In some embodiments, the method of FIG. 2 can be performed using different images of the part of the item. Assume that a plurality of images of the part of the item has been acquired, which differ by at least one acquisition parameter (e.g. different viewing/observation angle, different illumination angle, different angle of collection, different position or orientation of the part of the item, etc.).

For each parameter value (e.g. first viewing angle, second viewing angle, etc.), operations 200 to 240 can be performed, thereby providing a different probability that the item conceals a prohibited material. An aggregation of these different probabilities can be performed to output a final decision whether the item conceals a prohibited material.

In some embodiments, for each parameter value (e.g. first viewing angle, second viewing angle, etc.), a set of pixels detected as "positive" (informative of a prohibited material) is obtained. Statistical processing of this data can be performed, such as determining an average number of positive pixels obtained over the different acquisitions with different parameter values, determining a median number of positive pixels over the different acquisitions with different parameter values, etc. This statistical data can be compared to a threshold (which can be predefined), to output a final decision whether the item conceals a prohibited material.

As can be understood from the description above, once the image of the part of the item has been obtained, in some embodiments, it is possible to detect whether it conceals a prohibited material without using a machine learning algorithm or network (the method can rather use e.g. histogram(s)).

Figure 4B:
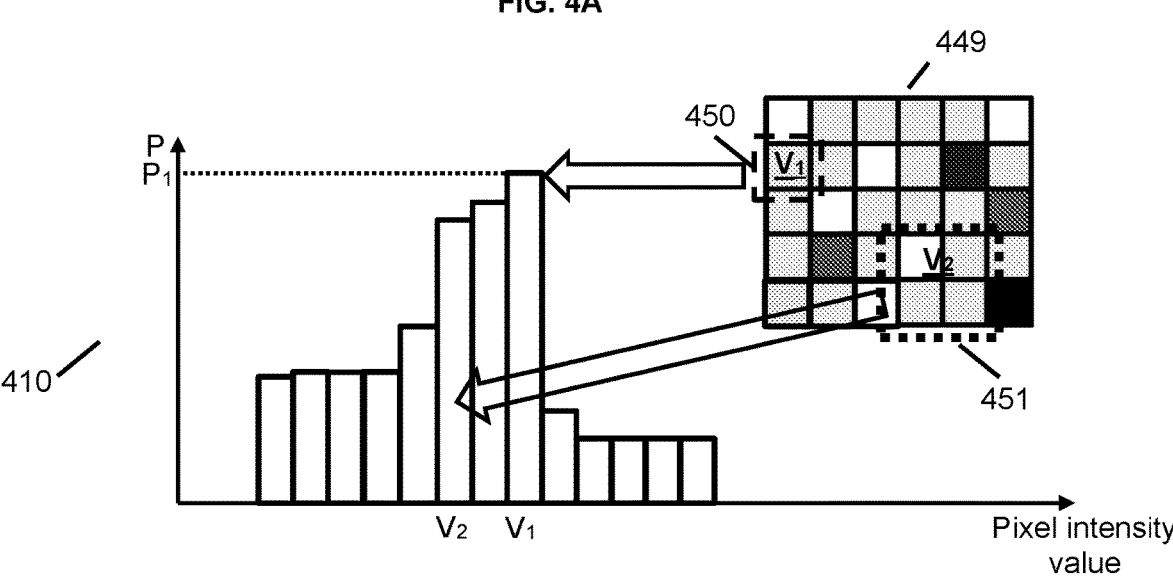
FIG. 4B illustrates a non-limitative example of a pixel intensity distribution of a part of an item, and a pixel intensity frequency distribution of a similar part of an item associated with a prohibited material.

Attention is now drawn to FIGS. 4A and 4B, which depict a possible implementation of operation 240.

The pixel intensity of each pixel of the image of the part of the item is available in $D_{part}$. This is illustrated in the non-limitative example of FIG. 4B, in which pixel intensity of each pixel is obtained (see reference 449, corresponding to $D_{part}$).

For each given pixel intensity value extracted from $D_{part}$, the probability stored in $D_{positive}$ for this given pixel intensity value is extracted from $D_{positive}$ (operation 400).

In the non-limitative example of FIG. 4B, the pixel intensity value $V_1$ of pixel 450 is searched in the histogram of $D_{positive}$ (see reference 410), and a corresponding probability $P_1$ is extracted.

As already explained above, in some embodiments, the given pixel intensity can correspond to a vector including pixel intensity values for different channels (e.g. R/G/B pixel intensity, etc.) and therefore, a probability can be obtained for this vector.

An output of operation 400 includes, for each pixel, a first probability $P_{positive/pixel}$.

$P_{positive/pixel}$ is a probability that the pixel is informative of a prohibited material.

If $P_{positive/pixel}$ is high, this means that there is a high probability that the pixel is informative of a prohibited material, and if $P_{positive/pixel}$ is low, this means that there is a low probability that the pixel is informative of a prohibited material.

In some embodiments, pixel intensity value associated with a group of pixels can be extracted from $D_{part}$ (see group of pixels 451), For example, the average pixel intensity $V_2$ of the group of pixels 451 is extracted from $D_{part}$ and the probability stored in $D_{positive}$ for this given pixel intensity value $V_2$ is then extracted from $D_{positive}$.

Operation 400 described with regard to $D_{positive}$ can be performed similarly for $D_{negative}$ (see operation 410).

For each given pixel intensity value extracted from $D_{part}$, the probability stored in $D_{negative}$ for this given pixel intensity value is extracted from $D_{negative}$.

Figure 4C:
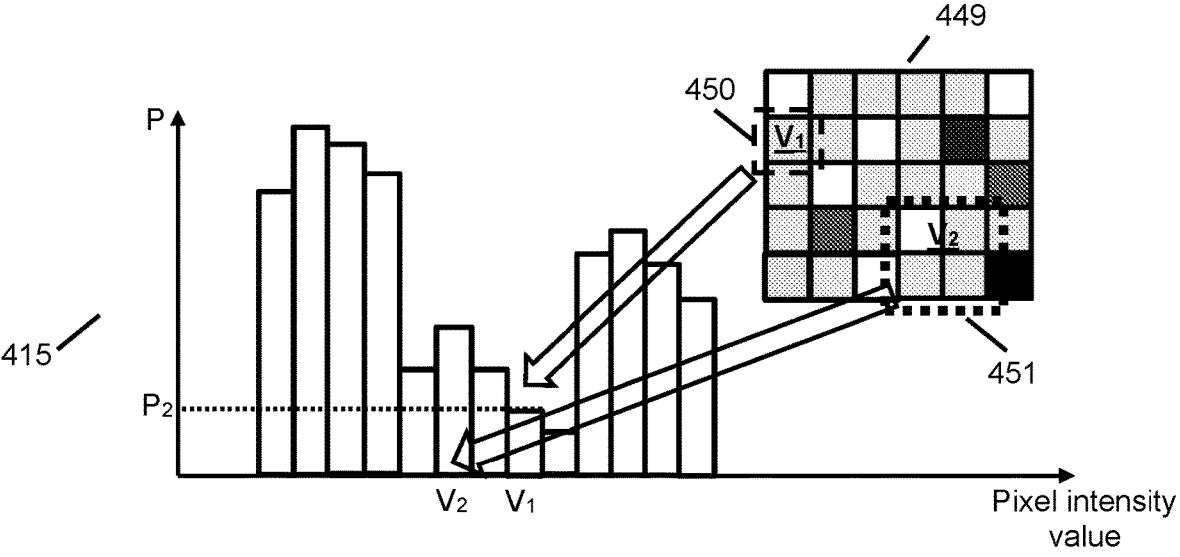
FIG. 4C illustrates a non-limitative example of a pixel intensity distribution of a part of an item, and a pixel intensity frequency distribution of a similar part of an item which is not associated with a prohibited material.
Figure 5:
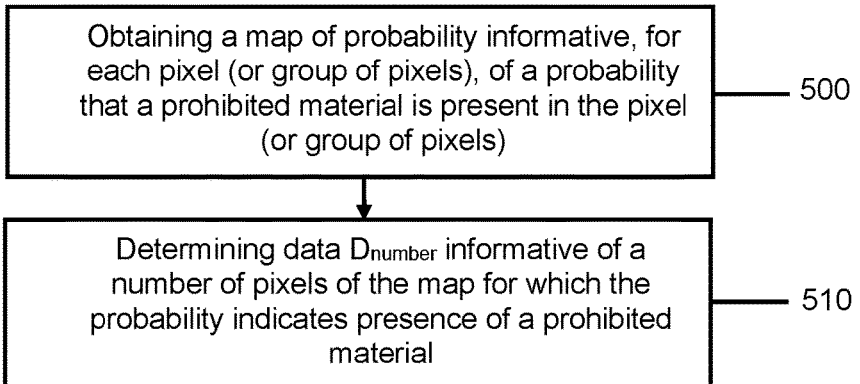
FIG. 5 illustrates a flow chart of an embodiment of a method using a number of positive pixels in a map of probability informative of a presence of a prohibited material.
Figure 7:
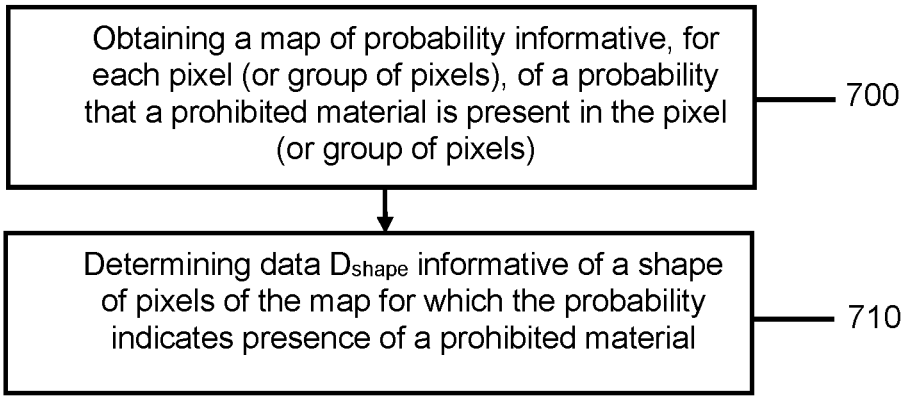
FIG. 7 illustrates a flow chart of an embodiment of a method using a shape of positive pixels in a map of probability informative of a presence of a prohibited material.

In the non-limitative example of FIG. 4C, the pixel intensity value $V_1$ of pixel 450 is searched in the histogram of $D_{negative}$ (see reference 415), and a corresponding probability $P_2$ is extracted.

As already explained above, in some embodiments, the given pixel intensity can correspond to a vector including pixel intensity values for different channels (e.g. R/G/B pixel intensity) and therefore, a probability can be obtained for this vector.

An output of operation 410 includes, for each pixel, a second probability $P_{negative/pixel}$.

$P_{negative/pixel}$ is a probability that the pixel is informative of a prohibited material. In some embodiments, $P_{negative/pixel}$ can be defined as a probability that the pixel is not informative of a prohibited material.

In some embodiments, pixel intensity value associated with a group of pixels can be extracted from $D_{part}$ (see group of pixels 451). For example, the average pixel intensity $V_2$ of the group of pixels 451 is extracted from $D_{part}$ and the probability stored in $D_{negative}$ for this given pixel intensity value $V_2$ is then extracted from $D_{negative}$.

If $P_{negative/pixel}$ is high, this means that there is a high probability that the pixel is not informative of a prohibited material, and if $P_{negative/pixel}$ is low, this means that there is a low probability that the pixel is not informative of a prohibited material.

For each pixel (or group of pixels), the method can include using the first probability $P_{positive/pixel}$ and the second probability $P_{negative/pixel}$ to determine (operation 420) an aggregated probability that the pixel (or group of pixels) in the image of the part of the item is informative of a prohibited material.

The method can include performing (operation 430) a comparison between the aggregated probability and a threshold. Based on this comparison, it is possible to assign to each pixel (or group of pixels) of the image of the part of the item, a tag (positive/negative) which indicates whether it corresponds to a prohibited material or not. In some embodiments, the tag can also include a probability (e.g. between 0 and 1) which depends on the value of $P_{positive/pixel}$ and $P_{negative/pixel}$.

For example, assume that the aggregated probability corresponds to a ratio between $P_{positive/pixel}$ and $P_{negative/pixel}$. In this particular example, the higher the ratio, the higher the probability that the pixel is informative of a prohibited material, and conversely (note that the ratio can be defined the other way round, or another relationship can be used).

If the ratio is above or equal to a threshold (the threshold can be pre-tuned in advance), this indicates presence of a prohibited material. If the ratio is below a threshold, this indicates absence of a prohibited material. Based on this comparison, it is possible to assign to each pixel (or group of pixels) a tag (positive or negative) or a probability (e.g. between 0 and 1) which indicate whether presence of a prohibited material is suspected in this pixel (or group of pixels).

A map is therefore obtained, which indicates, for each pixel (or group of pixels) of the image of the part of the item, whether it includes a prohibited material or not (or a probability that it includes a prohibited material). "Positive" pixels correspond to pixels for which presence of a prohibited material is suspected, and "negative" pixels correspond to pixels for which presence of a prohibited material is not suspected.

The map (called hereinafter after map of probability) can be used to determine whether a prohibited material is present.

According to some embodiments (see FIG. 5), once a map of probability (operation 500) has been obtained (which indicates for each pixel or group of pixels the probability that a prohibited material is present), it is possible to determine (operation 510) data $D_{number}$ informative of a number of pixels of the map for which the probability indicates presence of a prohibited material (this corresponds to pixels associated with a probability in the map which is above a threshold which can be set e.g. by an operator).

The data $D_{number}$ can be used to determine whether the part of the item conceals a prohibited material. The data $D_{number}$ can be compared to a threshold (the threshold can pre-defined and/or can be set e.g. by an operator, in order to set the minimum amount of prohibited material which needs to be detected). If the comparison indicates that $D_{number}$ is equal to or above the threshold, this indicates that the part of the item conceals a prohibited material (or at least can be used as an indicator that there is a high probability that the part of the item conceals a prohibited material). To the contrary, if the comparison indicates that $D_{number}$ is below the threshold, this indicates that the part of the item does not conceal a prohibited material. Indeed, if a small number of pixels has been identified as being informative of a prohibited material, it can be deduced that these pixels do not correspond to a prohibited material, which generally expands over a certain number of pixels.

According to some embodiments (see FIG. 6A), once the map of probability (operation 600) has been obtained (which indicates for each pixel or group of pixels the probability that a prohibited material is present), it is possible to determine (operation 610) data $D_{continuity}$ informative of a continuity between the pixels of the map which are informative of a presence of a prohibited material. $D_{continuity}$ indicates to what extent the "positive" pixels are connected one to the other. For example, if many positive pixels are spread in the map without connection between them, then $D_{continuity}$ will include a low score for the continuity.

According to some embodiments, operation 610 can include determining groups (also called blobs or clusters) of adjacent (also called interconnected or continuous) "positive" pixels. An algorithm such as cv2 (Python) can be used. This is not limitative.

Various data informative of these blobs can be determined. For example, the size of the biggest blob can be determined. If this size is above a threshold, this can be used as an indicator that a prohibited material is present. In some embodiments, the number of blobs, the number of pixels per blob, the average size of the blobs (etc.) can be determined in order to assess whether a prohibited material is present.

If the positive pixels tend to be concentrated, they get a higher score than if the positive pixels are spread, since the prohibited material is generally a continuous material hidden within the item.

$D_{continuity}$ can be used to determine whether the part comprises a prohibited material. Indeed, the higher the continuity between the positive pixels, the higher the probability that the part includes a prohibited material, and conversely.

It is therefore possible to compare $D_{continuity}$ to a threshold (which can be pre-tuned or defined by an operator). If the comparison indicates that $D_{continuity}$ is equal to or above the threshold, this indicates that the part of the item conceals a prohibited material (or at least can be used as an indicator that there is a high probability that the part of the item conceals a prohibited material). To the contrary, if the comparison indicates that $D_{continuity}$ is below the threshold, this indicates that the part of the item does not conceal a prohibited material.

A non-limitative example is provided in FIG. 6B, which depicts a map of probability 625, in which positive pixels have a grey color and negative pixels have a white color.

Five blobs ($630_1$, $630_2$, $630_3$, $630_4$, and $630_5$) of adjacent pixels have been identified. The biggest blob $630_1$ includes an area of four pixels by four pixels. If the threshold is defined as three pixels by three pixels, the biggest blob $630_1$ can induce triggering of an alert that a prohibited material is present.

According to some embodiments (see FIG. 7), once the map of probability (operation 700) has been obtained (which indicates for each pixel or group of pixels the probability that a prohibited material is present), it is possible to determine (operation 710) data $D_{shape}$ informative of a shape of pixels of the map for which the probability indicates presence of a prohibited material. The data $D_{shape}$ can be used to determine whether the part of the item conceals a prohibited material.

$D_{shape}$ can include shape properties of the blobs of adjacent pixels, such as aspect ratio, smear aspect of the blob, ratio between length and width, etc. These properties can be provided e.g. by the cv2 algorithm. For each property, a score can be assigned which is then compared to a pre-defined threshold, in order to indicate whether the corresponding value is indicative of a prohibited material. Indeed, in some embodiments, the shape properties of the blobs can have specific patterns for a prohibited material. This is however not limitative.

As mentioned above, each data $D_{number}$ and/or $D_{shape}$ and/or $D_{continuity}$ can be used to generate a given indicator of whether a prohibited material is present. In some embodiments, a decision of whether a prohibited material is present can be taken by aggregating the different indicators obtained using $D_{number}$ and/or $D_{shape}$ and/or $D_{continuity}$.

Attention is now drawn to FIG. 8.

The method depicted in FIG. 8 includes obtaining (operation 800) an image of at least a part of an item (see e.g.

reference 105 in FIG. 1) acquired by an acquisition device (see e.g. reference 101 in FIG. 1).

The method includes determining (operation 805) a first area of the image corresponding to a first part of the item.

The method includes determining (operation 810) a second area of the image corresponding to a second part of the item. The second part of the item is different from the first part of the item.

Figure 9:
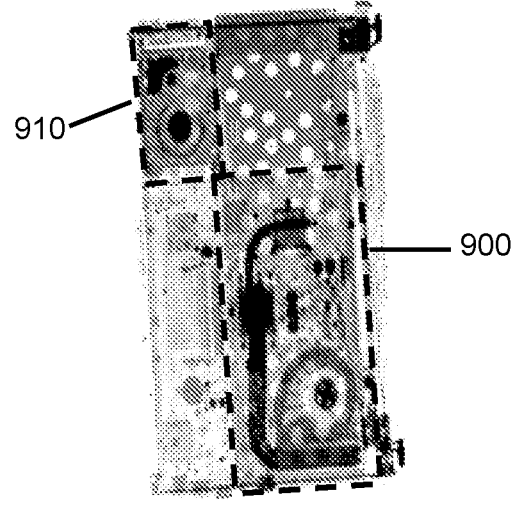
FIG. 9 illustrates a non-limitative example of an item (a laptop) which can be divided into a plurality of areas.

A non-limitative example is provided in FIG. 9.

In the example of FIG. 9, the item is a laptop. The first part of the item (see reference 900) corresponds to the keyboard area of the laptop. The second part of the item (see reference 910) corresponds to the battery area of the laptop. This can be determined using an object detection algorithm (e.g. a trained deep neural network, or other adapted algorithms).

The method further includes obtaining (operation 820) data $D_{first\,part}$ informative of a pixel intensity of the first part of the item in the image. For example, $D_{first\,part}$ stores, for each pixel (or group of pixels), the intensity of the pixel (or group of pixels), and, if necessary, the position of each pixel.

The method further includes obtaining (operation 830) data $D_{second\,part}$ informative of a pixel intensity of the second part of the item in the image. For example, $D_{second\,part}$ stores, for each pixel (or group of pixels), the intensity of the pixel (or group of pixels), and, if necessary, the position of each pixel.

The method includes obtaining (operation 840), from a database (e.g. database 110 in FIG. 1), data $D_{positive,\,first\,part}$ informative of a pixel intensity in at least one image of a part of a first item. The part of the first item is associated with a prohibited material in the image (this corresponds to a "positive" sample). The part of the first item meets the similarity criterion with the first part of the item. For example, since the first part (see reference 900) of the item is a keyboard area of a laptop, the part of the first item is also a keyboard area.

In some embodiment, data $D_{positive,\,first\,part}$ is informative of a pixel intensity in a plurality of images of the part of the first item (e.g. images of a keyboard area of a laptop concealing a prohibited material, acquired with different viewing angles). In some embodiment, data $D_{positive,\,first\,part}$ is informative of a pixel intensity in a plurality of images, wherein at least two images of the plurality of images are informative of a part of a different first item. For example, if the first part (see reference 900) of the item is a keyboard area of a laptop, images of keyboard areas of different laptops concealing a prohibited material (one or more images per different laptop) are used to generate $D_{positive,\,first\,part}$.

The method further includes obtaining (operation 850), from a database (e.g. database 110 in FIG. 1), data $D_{negative,\,first\,part}$ informative of a pixel intensity in at least one image of a part of a second item. The part of the second item is not associated with a prohibited material in the image (this corresponds to a "negative" sample). The part of the second item meets the similarity criterion with the first part of the item. For example, since the first part (see reference 900) of the item is a keyboard area of a laptop, the part of the second item is also a keyboard area.

In some embodiment, data $D_{negative,\,first\,part}$ is informative of a pixel intensity in a plurality of images of the part of the second item (e.g. images of a keyboard area of a laptop which does not conceal a prohibited material, acquired with different viewing angles). In some embodiment, data $D_{negative,\,first\,part}$ is informative of a pixel intensity in a plurality of images, wherein at least two images of the plurality of images are informative of a part of a different second item. For example, if the first part (see reference 900) of the item is a keyboard area of a laptop, images of keyboard areas of different laptops which do not conceal a prohibited material (one or more images per different laptop) are used to generate $D_{negative,\,first\,part}$.

The method further includes obtaining (operation 860), from a database (e.g. database 110 in FIG. 1), data $D_{positive,\,second\,part}$ informative of a pixel intensity in at least one image of a part of a third item. The part of the third item is associated with a prohibited material in the image (this corresponds to a "positive" sample). The part of the third item meets the similarity criterion with the second part of the item. For example, since the second part (see reference 910) of the item is a battery area of a laptop, the part of the third item is also a battery area.

In some embodiment, data $D_{positive,\,second\,part}$ is informative of a pixel intensity in a plurality of images of the part of the third item (e.g. images of battery area of a laptop concealing a prohibited material, acquired with different viewing angles). In some embodiment, data $D_{positive,\,second\,part}$ is informative of a pixel intensity in a plurality of images, wherein at least two images of the plurality of images are informative of a part of a different third item. For example, if the second part (see reference 910) of the item is a battery area of a laptop, images of battery areas of different laptops concealing a prohibited material (one or more images per different laptop) are used to generated $D_{positive,\,second\,part}$.

The method further includes obtaining (operation 870), from a database (e.g. database 110 in FIG. 1), data $D_{negative,\,second\,part}$ informative of a pixel intensity in at least one image of a part of a fourth item. The part of the fourth item is not associated with a prohibited material in the image (this corresponds to a "negative" sample). The part of the fourth item meets the similarity criterion with the second part of the item. For example, since the second part (see reference 910) of the item is a battery area of a laptop, the part of the fourth item is also a battery area.

In some embodiment, data $D_{negative,\,second\,part}$ is informative of a pixel intensity in a plurality of images of the part of the fourth item (e.g. images of a battery area of a laptop, which does not conceal a prohibited material, and acquired with different viewing angles). In some embodiment, data $D_{negative,\,second\,part}$ is informative of a pixel intensity in a plurality of images, wherein at least two images of the plurality of images are informative of a part of a different fourth item. For example, if the second part (see reference 910) of the item is a battery area of a laptop, images of battery areas of different laptops, which do not conceal a prohibited material (one or more images per different laptop), are used to generated data $D_{negative,\,second\,part}$.

The method further includes using (operation 880) the data $D_{positive,\,first\,part}$, the data $D_{negative,\,first\,part}$ and the data $D_{first\,part}$ to detect whether the first part of the item is associated with a concealed prohibited material in the image. Operation 880 is similar to operation 240 and is therefore not described again (see also FIG. 4A for a possible implementation of operation 240). In the embodiment of FIG. 8, operation 880 is performed on a specific area of the item (e.g. keyboard area of the laptop).

The method further includes using (operation 890) the data $D_{positive,\,second\,part}$, the data $D_{negative,\,second\,par}$ and the data $D_{second\,part}$ to detect whether the second part of the item is associated with a concealed prohibited material in the image. Operation 890 is similar to operation 240 (see also FIG. 4A for a possible implementation of operation 240). In the embodiment of FIG. 8, operation 890 is performed on a specific area of the item (e.g. battery area of the laptop).

Based on the output of operations 880 and 890, an action can be performed. If it is detected that the first part of the item and/or the second part of the item is associated with a concealed prohibited material, an action can be performed (operation 895). Examples of actions have been provided above and can be used hereinafter. Note that it is possible to indicate to an operator in which location (first part and/or second part) of the item the prohibited material has been identified (e.g. this can be displayed on an image of the item using device 107).

Figure 10A:
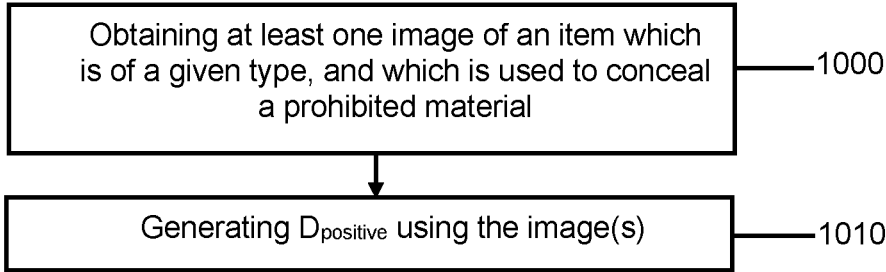
FIG. 10A illustrates a flow chart of an embodiment of a method of generating data informative of a pixel intensity frequency distribution of one or more images of items associated with a prohibited material.

Attention is now drawn to FIG. 10A.

FIG. 10A depicts a method which can be used to generate $D_{positive}$ for a given type of item used to conceal a prohibited material. In other words, $D_{positive}$ can be used in the various methods above to detect presence of a prohibited material in an item meeting the similarity criterion with this given type of item.

Assume for example that the given type of item is a laptop. The method includes obtaining (operation 1000) at least one image of an item which is of the given type, and which is used to conceal a prohibited material (e.g. an explosive material). Each image can typically include only (or mostly) the item of the given type.

In some embodiments, a plurality of images of the item of the given type can be obtained. The images can differ by an acquisition parameter, such as the viewing angle, the distance between the item and the acquisition device, the orientation of the item, etc.

In some embodiments, a plurality of images is obtained, each image including a different item (each item being of the given type) used to conceal a prohibited material. For example, if it is intended to generate $D_{positive}$ for a laptop, then various images of different laptops used to conceal a prohibited material (e.g. explosive material) are obtained. The different laptops can differ e.g. by their brand, their size, their color, etc. For each item (e.g. each laptop), it is possible to obtain one or more images (for example, a plurality of images which differ by an acquisition parameter).

The method includes generating (operation 1010) data $D_{positive}$ based on the images obtained at operation 1000. As explained hereinafter, operation 1010 can include determining, for each pixel intensity value in the images obtained at operation 1000, a frequency of occurrence.

Figure 10B:
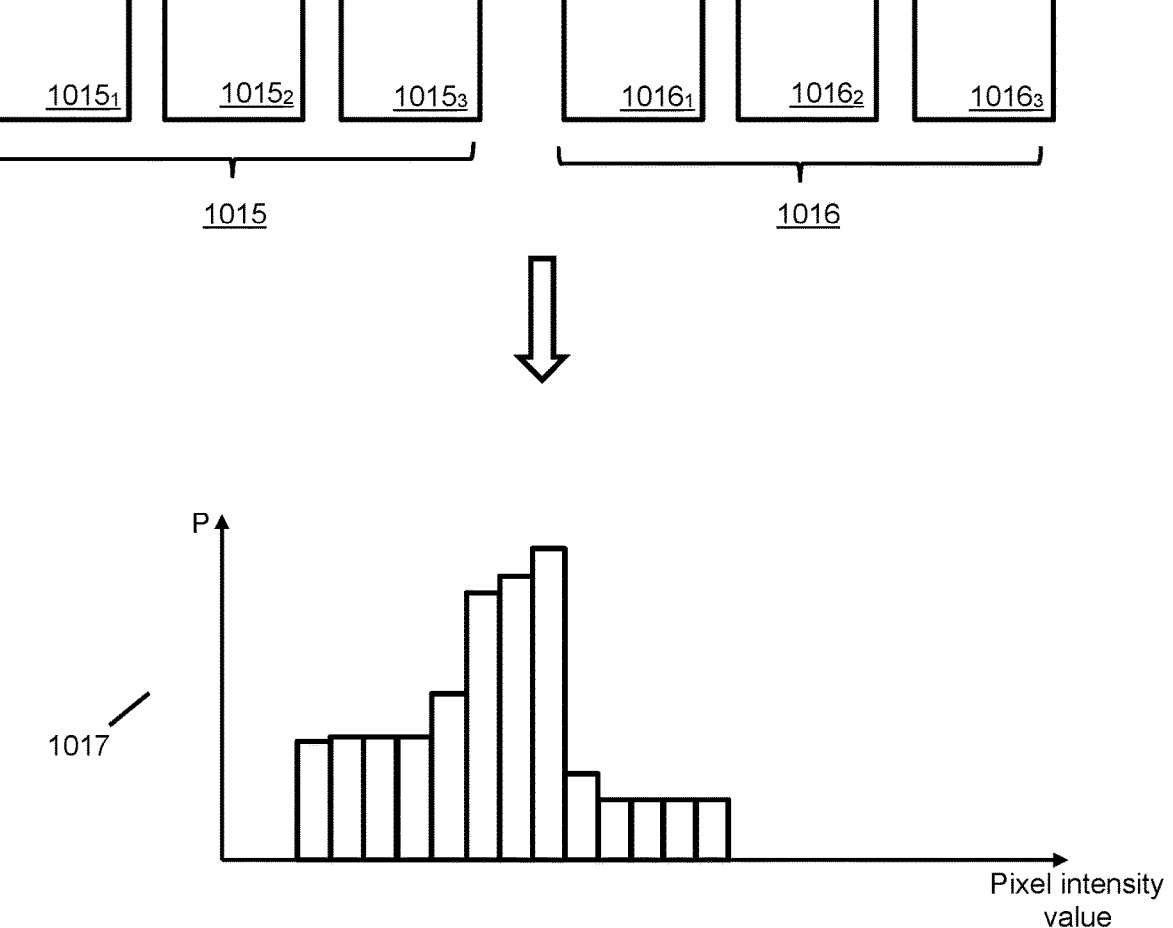
FIG. 10B illustrates a non-limitative example of the method of FIG. 10A.

A non-limitative example is provided with reference to FIG. 10B. Assume that it is intended to generate data $D_{positive}$ for a laptop.

A plurality of images ($1015_1$, $1015_2$, $1015_3$) of a first laptop 1015 which includes a prohibited material is obtained. The images $1015_1$, $1015_2$, $1015_3$ can differ e.g. by the angle of observation/illumination of the acquisition device, distance and/or orientation of the first laptop 1015, etc.

A plurality of images ($1016_1$, $1016_2$, $1016_3$) of a second laptop 1016 (different from the first laptop 1015) which includes a prohibited material is obtained. The images $1016_1$, $1016_2$, $1016_3$ can differ e.g. by the angle of observation/illumination of the acquisition device, distance and/or orientation of the second laptop 1016, etc.

Based on these images ($1015_1$, $1015_2$, $1015_3$, $1016_1$, $1016_2$, $1016_3$), a histogram 1017 can be built which stores, for each pixel intensity value present in the images, a frequency of occurrence of this pixel intensity value in the images. Since the images are "positive" images including a prohibited material, this frequency reflects, for each given pixel intensity value, a probability (P) that this given pixel intensity is informative of a prohibited material (in this type of item—e.g. laptop).

The plurality of images can correspond to real images and/or to simulated images and/or to real images in which a prohibited material is artificially inserted using a computer-based image processing algorithm.

According to some embodiments, $D_{positive}$ is generated for a given type of item and for a given type of prohibited material. For example, $D_{positive/explosive}$ is generated using images of laptops used to conceal an explosive material, and $D_{positive/drugs}$ is generated using images of laptops used to conceal drugs. This is however not limitative.

In some embodiments, it is possible to generate $D_{positive}$ for a given type of item and for a given type of explosive material. $D_{positive/explosive\_1}$ is generated using images of this given type of item which conceals a first explosive material, $D_{positive/explosive\_2}$ is generated using images of this given type of item which conceals a second explosive material (different from the first explosive material), etc. The same can be performed for different types of prohibited materials.

The method of FIG. 10A can be performed similarly for a part of a given item (fraction of an item—as explained with reference to FIG. 10C).

The part of the given item is of a given type. Assume for example that the part of the given item is the battery area of the laptop.

In other words, $D_{positive}$ can be used in the various methods above to detect presence of a prohibited material in a part of an item meeting the similarity criterion with the part of the given item.

The method includes obtaining (operation 1020) at least one image of the part of the given item, which is used to conceal a prohibited material (e.g. an explosive material). Each image can typically include only (or mostly) the part of the given item.

In some embodiments, a plurality of images of the part of the given item can be obtained. The images can differ by an acquisition parameter, such as the viewing angle, the distance between the item and the acquisition device, the orientation of the item, etc.

In some embodiments, a plurality of images is obtained, each image including a part of a different item (of the given type) used to conceal a prohibited material. For example, if it is intended to generate $D_{positive}$ for a battery area of a laptop, then various images of different battery areas of laptops used to conceal a prohibited material (e.g. explosive material) are obtained. The different laptops can differ e.g. by their brand, their size, their color, etc. For each item (e.g. each laptop), it is possible to obtain one or more images of its battery area (for example, a plurality of images which differ by an acquisition parameter).

The method includes generating (operation 1030) $D_{positive}$ based on the images obtained at operation 1020. As explained above, operation 1030 can include determining, for each pixel intensity value in the images obtained at operation 1020, a frequency of occurrence (which corresponds, in turn, to a probability that the pixel is informative of a prohibited material). In some embodiments, $D_{positive}$ can be calculated for a pixel intensity represented using a plurality of pixel intensity channels (e.g. R\G/B channels).

In some embodiments, it is possible to generate $D_{positive}$ for a part of an item of a given type and for a given type of prohibited material. For example, $D_{positive/explosive\_1}$ is generated using images of a part of an item of this given type (e. g. battery area of a laptop), and which conceals a first explosive material, $D_{positive/explosive\_2}$ is generated using images of a part of an item of this given type (e. g. battery area of a laptop), and which conceals a second explosive material (different from the first explosive material), etc. The same can be performed for different types of prohibited materials.

FIG. 11A depicts a method which can be used to generate $D_{negative}$ for a given type of item.

Assume for example that the given type of item is a laptop. The method includes obtaining (operation 1100) at least one image of an item which is of the given type, and which is not used to conceal a prohibited material. Each image can typically include only (or mostly) the item of the given type.

In some embodiments, a plurality of images of the item of the given type can be obtained. The images can differ by an acquisition parameter, such as the viewing angle, the distance between the item and the acquisition device, the orientation of the item, etc.

In some embodiments, a plurality of images is obtained, each image including a different item (each item being of the given type), which is not used to conceal a prohibited material. For example, if it is intended to generate $D_{negative}$ for a laptop, then various images of different laptops (which are not used to conceal a prohibited material) are obtained. The different laptops can differ e.g. by their brand, their size, their color, etc. For each item (e.g. each laptop), it is possible to obtain one or more images (for example, a plurality of images which differ by an acquisition parameter).

The method includes generating (operation 1110) $D_{negative}$ based on the images obtained at operation 1100. As explained above (with respect to generation of $D_{positive}$), operation 1110 can include determining, for each pixel intensity value in the images obtained at operation 1100, a frequency of occurrence. In some embodiments, $D_{negative}$ can be calculated for a pixel intensity represented using a plurality of pixel intensity channels (e.g. R/G/B channels).

Since the images obtained at operation 1100 are "negative" images which do not include a prohibited material, this frequency reflects, for each given pixel intensity value, a probability (P) that this given pixel intensity is not informative of a prohibited material (in this type of item—e.g. a laptop).

The method of FIG. 11A can be performed similarly for a part of a given item (fraction of an item—see FIG. 11C).

The part of the given item is of a given type. Assume for example that the part of the given item is the battery area of the laptop.

The method includes obtaining (operation 1120) at least one image of the given part of the item, which is not used to conceal a prohibited material. Each image can typically include only (or mostly) the given part of the item.

In some embodiments, a plurality of images of the part of the given item can be obtained. The images can differ by an acquisition parameter, such as the viewing angle, the distance between the item and the acquisition device, the orientation of the item, etc.

In some embodiments, a plurality of images is obtained, each image including a part of a different item (of the given type), which is not used to conceal a prohibited material.

For example, if it is intended to generate $D_{negative}$ for a battery area of a laptop, then various images of different battery areas of laptops which are not used to conceal a prohibited material are obtained. The different laptops can differ e.g. by their brand, their size, their color, etc. For each item (e.g. each laptop), it is possible to obtain one or more images of its battery area (for example, a plurality of images which differ by an acquisition parameter).

The method includes generating (operation 1130) $D_{negative}$ based on the images obtained at operation 1120. As explained above, operation 1130 can include determining, for each pixel intensity value in the images obtained at operation 1120, a frequency of occurrence (which corresponds, in turn, to a probability that the pixel is not informative of a prohibited material). In some embodiments, $D_{negative}$ can be calculated for a pixel intensity represented using a plurality of pixel intensity channels (e.g. R/G/B channels). In some embodiments, $D_{negative}$ can be calculated for a pixel intensity represented using a plurality of pixel intensity channels (e.g. R/G/B channels).

Note that generating of $D_{positive}$ and/or $D_{negative}$ requires much less images than the amount of images required for training a machine neural algorithm or network.

Figure 12:
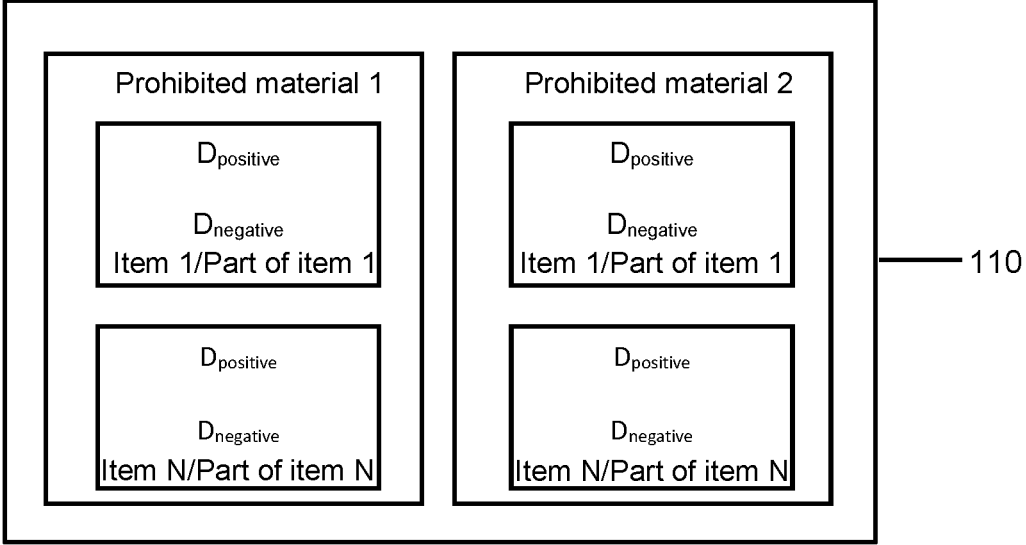
FIG. 12 illustrates a database storing various data usable to detect presence of a prohibited material in an image of an item/part of an item.

FIG. 12 illustrates the database 110 including $D_{positive}$ obtained for various items/parts of items, and $D_{negative}$ obtained for various items/parts of items. The method of FIGS. 10A, 10B, 10C, 11A and 11B can be used to generate data stored in the database 110. Note that the database 110 can be updated over time. For example, if a prohibited material has been identified in an image of a given type of item (using e.g. the system of FIG. 1), then this image can be used as a "positive" image to update the data $D_{positive}$ for this given type of item. Similarly, if a prohibited material has not been identified in a given image of a given type of item, then this image can be used as a "negative" image to update the data $D_{negative}$ for this given type of item. This enables to continuously update the database 110.

As illustrated in FIG. 12, for each type of item (or each type of a part of an item), corresponding data $D_{positive}$ and $D_{negative}$ are stored. For example, for a laptop, corresponding data $D_{positive}$ and $D_{negative}$ are stored, and for a cellular phone, corresponding data $D_{positive}$ and $D_{negative}$ are stored. In another example, for a keyboard area of a laptop, corresponding data $D_{positive}$ and $D_{negative}$ are stored and for a battery area of a laptop, corresponding data $D_{positive}$ and $D_{negative}$ are stored.

In some embodiments, for each type of item (or each type of a part of an item) and for each type of prohibited material, corresponding data $D_{positive}$ is stored. For example, for a laptop, corresponding data $D_{positive}$ is stored for explosives, and corresponding data $D_{positive}$ is stored for drugs. As mentioned above, $D_{positive}$ can be determined independently for different types of explosives or drugs or other prohibited materials.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system comprising one or more processing circuitries configured to:

obtain an image of an item of a given category, acquired by an acquisition device, determine a first area of the image corresponding to a first element of the item, wherein the first element of the item belongs to a predefined first sub-category of elements present in items of the given category, determine a second area of the image corresponding to a second element of the item, wherein the second element is different from the first element, wherein the second element of the item belongs to a predefined second sub-category of elements present in items of the given category, wherein the predefined second sub-category differs from the predefined first sub-category, obtain data Dfirst part informative of a pixel intensity of the first element of the predefined first sub-category in the image, obtain data Dsecond part informative of a pixel intensity of the second element of the predefined second sub-category in the image, obtain data Dpositive, first part informative of a pixel intensity in one or more first images of one or more first items of the given category that comprise one or more first elements of the predefined first sub-category of elements, wherein the one or more first elements of the predefined first sub-category are associated with a prohibited material, wherein the data Dpositive, first part comprises, for each given pixel intensity value of a plurality of different pixel intensity values in the one or more first images, a probability that this given pixel intensity value is informative of a prohibited material;

obtain data Dnegative, first part informative of a pixel intensity in one or more second images of one or more second items of the given category that comprise one or more second elements of the predefined second sub-category of elements, wherein the one or more second elements of the predefined second sub-category of elements are not associated with a prohibited material, wherein the data Dnegative, first part includes, for each given pixel intensity value of a plurality of different pixel intensity values in the one or more second images, a probability that this given pixel intensity value is not informative of a prohibited material;

obtain data Dpositive, second part informative of a pixel intensity in one or more third images of one or more third items of the given category that comprise one or more third elements of the predefined second sub-category of elements, wherein the one or more third elements of the predefined second sub-category are associated with a prohibited material, wherein the data Dpositive, second part comprises, for each given pixel intensity value of a plurality of different pixel intensity values in the one or more third images, a probability that this given pixel intensity value is informative of a prohibited material;

obtain data Dnegative, second part informative of a pixel intensity in one or more fourth images of one or more fourth items of the given category that comprise one or more fourth elements of the predefined second sub-category of elements, wherein the one or more fourth elements of the predefined second sub-category of elements are not associated with a prohibited material, wherein the data Dnegative, second part includes, for each given pixel intensity value of a plurality of different pixel intensity values in the one or more fourth images, a probability that this given pixel intensity value is not informative of a prohibited material;

use the data Dpositive, first part, the data Dnegative, first part and the data Dfirst part to detect whether the first element of the item is associated with a concealed prohibited material in the image, and use the data Dpositive, second part, the data Dnegative, second part and the data Dsecond part to detect whether the second element of the item is associated with a concealed prohibited material in the image.

2. The system of claim 1, wherein at least one of (i), (ii), (iii), (iv), (v) or (vi) is met:

(i) using the data Dpositive, first part, the data Dnegative, first part and the data Dfirst part to detect whether the first element of the item is associated with a concealed prohibited material in the image does not use a machine learning model;

(ii) using the data Dpositive, second part, the data Dnegative, second part and the data Dsecond part to detect whether the second element of the item is associated with a concealed prohibited material in the image does not use a machine learning model;

(iii) data Dpositive, first part is not used to train a machine learning model;

(iv) data Dnegative, first part is not used to train a machine learning model;

(v) data Dpositive, second part is not used to train a machine learning model;

(vi) data Dnegative, second part is not used to train a machine learning model.

3. The system of claim 1, wherein at least one of (i), (ii), (iii) or (iv) is met:

(i) the data Dpositive, first part is informative of a frequency distribution of pixel intensity in the one or more first images;

(ii) the data Dnegative, first part is informative of a frequency distribution of pixel intensity in the one or more second images;

(iii) the data Dpositive, second part is informative of a frequency distribution of pixel intensity in the one or more third images;

(iv) the data Dnegative, second part is informative of a frequency distribution of pixel intensity in the one or more fourth images.

4. The system of claim 1, wherein the first area comprises a plurality of groups of one or more pixels informative of the first element of the item, wherein the system is configured to, for each group of one or more pixels of the plurality of groups:

use the data Dpositive, first part and pixel intensity of the one or more pixels of the group to determine a probability Ppositive/pixel/first part that the group of one or more pixels is informative of a prohibited material, and use the data Dnegative, first part and pixel intensity of the one or more pixels of the group to determine a probability Pnegative/pixel/first part that the group of one or more pixels is informative of a prohibited explosive material.

5. The system of claim 4, wherein at least one of (i) or (ii) is met:

(i) determining Ppositive/pixel/first part includes:

extracting a first probability associated with the pixel intensity of the one or more pixels of the group in the data Dpositive, first part, and using said first probability to determine Ppositive/pixel/first part;

(ii) determining Pnegative/pixel/first part includes:

extracting a second probability associated with the pixel intensity of the one or more pixels of the group in the data Dnegative, first part, and using said second probability to determine Pnegative/pixel/first part.

6. The system of claim 4, configured to, for said each group of one or more pixels informative of the first element in the image:

use the probability Ppositive/pixel/first part and the probability Pnegative/pixel/first part to determine an aggregated probability that the group of one or more pixels is informative of a prohibited material, perform a comparison between the aggregated probability and a threshold, determine whether the group of one or more pixels is informative of a prohibited material based on a result of the comparison.

7. The system of claim 1, configured to determine at least one of:

data Dnumber informative of a number of pixels of the image which are informative of a presence of a prohibited material, or data Dshape informative of a shape of pixels of the image which are informative of a presence of a prohibited material, or data Dcontinuity informative of a continuity between pixels of the image which are informative of a presence of a prohibited material, and use at least one of Dnumber or Dshape or Dcontinuity to determine whether the item is associated with a concealed prohibited material in the image.

8. The system of claim 1, configured to perform at least one of (i) or (ii):

(i) use the data Dpositive, first part, the data Dnegative, first part and the data Dfirst part to generate for each group of one or more pixels informative of the first element of the item in the image, a probability that the group of one or more pixels comprises a prohibited material, thereby obtaining a first map of probability, and use the first map of probability to determine whether the first element of the item is associated with a concealed prohibited material in the image;

(ii) use the data Dpositive, second part, the data Dnegative, second part and the data Dsecond part to generate for each group of one or more pixels informative of the second element of the item in the image, a probability that the group of one or more pixels comprises a prohibited material, thereby obtaining a second map of probability, and use the second map of probability to determine whether the second element of the item is associated with a concealed prohibited material in the image.

9. The system of claim 1, configured to perform at least one of (i) or (ii):

(i) use the data Dpositive, first part, the data Dnegative, first part and the data Dfirst part to generate for each group of one or more pixels informative of the first element of the item in the image, a probability that the group of one or more pixels comprises a prohibited material thereby obtaining a first map of probability, determine data informative of a number of pixels of the first map associated with a probability indicative of a presence of a prohibited material, and use said data informative of the number of pixels of the first map to determine whether the first part of the item is associated with a concealed prohibited material in the image;

(ii) use the data Dpositive, second part, the data Dnegative, second part and the data Dsecond part to generate for each group of one or more pixels informative of the second element of the item in the image, a probability that the group of one or more pixels comprises a prohibited material, thereby obtaining a second map of probability, determine data informative of a number of pixels of the second map associated with a probability indicative of a presence of a prohibited material, and use said data informative of the number of pixels of the second map to determine whether the second part of the item is associated with a concealed prohibited material in the image.

10. The system of claim 1, configured to perform at least one of (i) or (ii):

(i) use the data Dpositive, first part, the data Dnegative, first part and the data Dfirst part to generate for each group of one or more pixels informative of the first element of the item in the image, a probability that the group of one or more pixels comprises a prohibited material, thereby obtaining a first map of probability, determine data informative of a shape of pixels of the first map associated with a probability indicative of a presence of a prohibited material, and use said data informative of the shape of pixels of the first map to determine whether the first element of the item is associated with a concealed prohibited material in the image;

(ii) use the data Dpositive, second part, the data Dnegative, second part and the data Dsecond part to generate for each group of one or more pixels informative of the second element of the item in the image, a probability that the group of one or more pixels comprises a prohibited material, thereby obtaining a second map of probability, determine data informative of a shape of pixels of the second map associated with a probability indicative of a presence of a prohibited material, and use said data informative of the shape of pixels of the second map to determine whether the second element of the item is associated with a concealed prohibited material in the image.

11. The system of claim 1, configured to perform at least one of (i) or (ii):

(i) use the data Dpositive, first part, the data Dnegative, first part and the data Dfirst part to generate for each group of one or more pixels informative of the first element of the item in the image, a probability that the group of one or more pixels comprises a prohibited material, thereby obtaining a first map of probability, determine data informative of a continuity between pixels of the first map associated with a probability indicative of a presence of a prohibited material, and use said data informative of the continuity between pixels of the first map to determine whether the first element of the item is associated with a concealed prohibited material in the image;

(ii) use the data Dpositive, second part, the data Dnegative, second part and the data Dsecond part to generate for each group of one or more pixels informative of the second element of the item in the image, a probability that the group of one or more pixels comprises a prohibited material, thereby obtaining a second map of probability, determine data informative of a continuity between pixels of the second map associated with a probability indicative of a presence of a prohibited material, and use said data informative of the continuity between pixels of the second map to determine whether the second element of the item is associated with a concealed prohibited material in the image.

12. The system of claim 1, wherein the prohibited material is an explosive material.

13. The system of claim 1, wherein the image of the item has been acquired while the item was located within a baggage.

14. The system of claim 1, wherein the one or more processing circuitries are operatively coupled to a database storing, for at least one type of prohibited material, and for each given type of a plurality of different types of items, at least one of:

Dpositive informative of a pixel intensity distribution in one or more first certain images of one or more first certain items, wherein the one or more first certain items are associated with a prohibited material in the one or more first certain images, wherein the one or more first certain items are of the given type, or Dnegative informative of a pixel intensity distribution in one or more second certain images of one or more second certain items, wherein the one or more second certain items are not associated with a prohibited material in the one or more second certain images, wherein the one or more second certain items are of the given type.

15. The system of claim 1, wherein at least one of (i), (ii), (iii) or (iv) is met:

(i) the one or more first images comprise a plurality of first images, wherein at least two images of the plurality of first images are informative of a different first item of the given category;

(ii) the one or more second images comprise a plurality of second images, wherein at least two images of the plurality of second images are informative of a different second item of the given category;

(iii) the one or more third images comprise a plurality of third images, wherein at least two images of the plurality of third images are informative of a different third item of the given category;

(iv) the one or more fourth images comprise a plurality of fourth images, wherein at least two images of the plurality of fourth images are informative of a different fourth item of the given category.

16. The system of claim 15, wherein at least one of (i), (ii), (iii) or (iv) is met:

(i) data Dpositive, first part includes, for each given pixel intensity value of a plurality of different pixel intensity values, a frequency of occurrence of this given pixel intensity value in the plurality of first images;

(ii) data Dnegative, first part includes, for each given pixel intensity value of a plurality of different pixel intensity values, a frequency of occurrence of this given pixel intensity value in the plurality of second images;

(iii) data Dpositive, second part includes, for each given pixel intensity value of a plurality of different pixel intensity values, a frequency of occurrence of this given pixel intensity value in the plurality of third images;

(iv) data Dnegative, second part includes, for each given pixel intensity value of a plurality of different pixel intensity values, a frequency of occurrence of this given pixel intensity value in the plurality of fourth images.

17. The system of claim 1, configured to:

obtain a set of images of another item acquired by the acquisition device, wherein the images of the set differ from each other by at least one acquisition parameter, obtain, for each given image of the set of images, data Dpart informative of a pixel intensity of said another item in the given image, obtain first data Dpositive informative of a pixel intensity in at least one first certain image of a part of a first certain item, wherein the part of the first certain item is associated with a prohibited material in the at least one first certain image, wherein the part of the first certain item meets a similarity criterion with said another item, obtain second data Dnegative informative of a pixel intensity in at least one second certain image of a part of a second certain item, wherein the part of the second certain item is not associated with a prohibited material in the at least one second certain image, wherein the part of the second certain item meets a similarity criterion with said another item, and use the first data Dpositive, the second data Dnegative and the data Dpart to determine whether said another item is associated with a concealed prohibited material in the set of images.

18. The system of claim 1, wherein the second area comprises a plurality of groups of one or more pixels informative of the second element of the item, wherein the system is configured to, for each group of one or more pixels of the plurality of groups:

use the data $D_{positive, \, second \, part}$ and pixel intensity of the one or more pixels of the group to determine a probability $P_{positive/pixel/second \, part}$ that the group of one or more pixels is informative of a prohibited material, and use the data $D_{negative, \, second \, part}$ and pixel intensity of the one or more pixels of the group to determine a probability $P_{negative/pixel/second \, part}$ that the group of one or more pixels is informative of a prohibited explosive material.

19. A method comprising, by one or more processing circuitries:

obtaining an image of an item of a given category, acquired by an acquisition device, determining a first area of the image corresponding to a first element of the item, wherein the first element of the item belongs to a predefined first sub-category of elements present in items of the given category, determining a second area of the image corresponding to a second element of the item, wherein the second element is different from the first element, wherein the second element of the item belongs to a predefined second sub-category of elements present in items of the given category, wherein the predefined second sub-category differs from the predefined first sub-category, obtaining data Dfirst part informative of a pixel intensity of the first element of the predefined first sub-category in the image, obtaining data Dsecond part informative of a pixel intensity of the second element of the predefined second sub-category in the image, obtaining data Dpositive, first part informative of a pixel intensity in one or more first images of one or more first items of the given category that comprise one or more first elements of the predefined first sub-category of elements, wherein the one or more first elements of the predefined first sub-category are associated with a prohibited material, wherein the data Dpositive, first part comprises, for each given pixel intensity value of a plurality of different pixel intensity values in the one or more first images, a probability that this given pixel intensity value is informative of a prohibited material;

obtaining data Dnegative, first part informative of a pixel intensity in one or more second images of one or more second items of the given category that comprise one or more second elements of the predefined second sub-category of elements, wherein the one or more second elements of the predefined second sub-category of elements are not associated with a prohibited material, wherein the data Dnegative, first part includes, for each given pixel intensity value of a plurality of different pixel intensity values in the one or more second images, a probability that this given pixel intensity value is not informative of a prohibited material;

obtaining data Dpositive, second part informative of a pixel intensity in one or more third images of one or more third items of the given category that comprise one or more third elements of the predefined second sub-category of elements, wherein the one or more third elements of the predefined second sub-category are associated with a prohibited material, wherein the data Dpositive, second part comprises, for each given pixel intensity value of a plurality of different pixel intensity values in the one or more third images, a probability that this given pixel intensity value is informative of a prohibited material;

obtaining data Dnegative, second part informative of a pixel intensity in one or more fourth images of one or more fourth items of the given category that comprise one or more fourth elements of the predefined second sub-category of elements, wherein the one or more fourth elements of the predefined second sub-category of elements are not associated with a prohibited material, wherein the data Dnegative, second part includes, for each given pixel intensity value of a plurality of different pixel intensity values in the one or more fourth images, a probability that this given pixel intensity value is not informative of a prohibited material;

using the data Dpositive, first part, the data Dnegative, first part and the data Dfirst part to detect whether the first element of the item is associated with a concealed prohibited material in the image, and using the data Dpositive, second part, the data Dnegative, second part and the data Dsecond part to detect whether the second element of the item is associated with a concealed prohibited material in the image.

20. A non-transitory storage device readable by one or more processing circuitries, tangibly embodying a program of instructions executable by the one or more processing circuitries to perform:

obtaining an image of an item of a given category, acquired by an acquisition device, determining a first area of the image corresponding to a first element of the item, wherein the first element of the item belongs to a predefined first sub-category of elements present in items of the given category, determining a second area of the image corresponding to a second element of the item, wherein the second element is different from the first element, wherein the second element of the item belongs to a predefined second sub-category of elements present in items of the given category, wherein the predefined second sub-category differs from the predefined first sub-category, obtaining data Dfirst part informative of a pixel intensity of the first element of the predefined first sub-category in the image, obtaining data Dsecond part informative of a pixel intensity of the second element of the predefined second sub-category in the image, obtaining data Dpositive, first part informative of a pixel intensity in one or more first images of one or more first items of the given category that comprise one or more first elements of the predefined first sub-category of elements, wherein the one or more first elements of the predefined first sub-category are associated with a prohibited material, wherein the data Dpositive, first part comprises, for each given pixel intensity value of a plurality of different pixel intensity values in the one or more first images, a probability that this given pixel intensity value is informative of a prohibited material;

obtaining data Dnegative, first part informative of a pixel intensity in one or more second images of one or more second items of the given category that comprise one or more second elements of the predefined second sub-category of elements, wherein the one or more second elements of the predefined second sub-category of elements are not associated with a prohibited material, wherein the data Dnegative, first part includes, for each given pixel intensity value of a plurality of different pixel intensity values in the one or more second images, a probability that this given pixel intensity value is not informative of a prohibited material;

obtaining data Dpositive, second part informative of a pixel intensity in one or more third images of one or more third items of the given category that comprise one or more third elements of the predefined second sub-category of elements, wherein the one or more third elements of the predefined second sub-category are associated with a prohibited material, wherein the data Dpositive, second part comprises, for each given pixel intensity value of a plurality of different pixel intensity values in the one or more third images, a probability that this given pixel intensity value is informative of a prohibited material;

obtaining data Dnegative, second part informative of a pixel intensity in one or more fourth images of one or more fourth items of the given category that comprise one or more fourth elements of the predefined second sub-category of elements, wherein the one or more fourth elements of the predefined second sub-category of elements are not associated with a prohibited material, wherein the data Dnegative, second part includes, for each given pixel intensity value of a plurality of different pixel intensity values in the one or more fourth images, a probability that this given pixel intensity value is not informative of a prohibited material;

using the data Dpositive, first part, the data Dnegative, first part and the data Dfirst part to detect whether the first element of the item is associated with a concealed prohibited material in the image, and using the data Dpositive, second part, the data Dnegative, second part and the data Dsecond part to detect whether the second element of the item is associated with a concealed prohibited material in the image.

* * * * *